(12) United States Patent
Yoshida et al.

(10) Patent No.: US 6,556,258 B1
(45) Date of Patent: Apr. 29, 2003

(54) DISPLAY DEVICE USING AMBIENT LIGHT A LIGHTING PANEL

(75) Inventors: Tetsushi Yoshida, Kanagawa-ken (JP); Tetsuo Muto, Hachioji (JP); Masaru Higuchi, Tokyo (JP); Hisashi Aoki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/300,307

(22) Filed: Apr. 27, 1999

(30) Foreign Application Priority Data

| Apr. 30, 1998 | (JP) | 10-120978 |
| Aug. 26, 1998 | (JP) | 10-240077 |
| Aug. 31, 1998 | (JP) | 10-245292 |
| Sep. 14, 1998 | (JP) | 10-260140 |

(51) Int. Cl.[7] .......................... G02F 1/1335
(52) U.S. Cl. .................. 349/61; 349/65; 349/57
(58) Field of Search .................. 349/61, 57, 64, 349/67, 68, 113; 362/26, 27, 31, 330

(56) References Cited

U.S. PATENT DOCUMENTS

| 4,994,941 A |   | 2/1991 | Wen ........................ 362/26 |
| 5,490,005 A | * | 2/1996 | Jueliger .................... 349/61 |
| 5,920,367 A | * | 7/1999 | Kajimoto et al. .......... 349/162 |

FOREIGN PATENT DOCUMENTS

| DE | 295 10 238 U1 | 12/1995 |
| GB | 2 227 871 A | 8/1990 |
| JP | 62-276527 | 12/1987 |
| JP | 3-249622 | 11/1991 |
| JP | 5-80322 | 4/1993 |
| JP | 9-145932 | 6/1997 |
| WO | 93/09454 | 5/1993 |
| WO | 97/44771 | 11/1997 |

* cited by examiner

Primary Examiner—Robert H. Kim
Assistant Examiner—Tai Duong
(74) Attorney, Agent, or Firm—Frishauf, Holtz, Goodman & Chick, P.C.

(57) ABSTRACT

A display device includes a non light-emitting type display element for controlling the transmission of incident light to display an image, a light radiating unit having a light source and a photoconductor, and arranged at the back of the display element for emitting illuminating light toward the display element and reflecting ambient light incident from the front of the display element at a given reflectivity toward the display element. An illumination brightness controller is provided for controlling the intensity of the illuminating light so that the screen brightness of the display element comprising the total of reflected light of the ambient light reflected on the photoconductor and transmitted light of the illuminating light is set up into a predetermined range according to the reflectivity of the photoconductor and the environmental illumination of the ambient light radiated from the front of the display element.

24 Claims, 10 Drawing Sheets

DISPLAY DEVICE USING AMBIENT LIGHT A LIGHTING PANEL

BACKGROUND OF THE INVENTION

The present invention relates to a display device using ambient light and a lighting panel.

Display devices having a non light-emitting type display element, such as a liquid crystal display element, in which light projected from the outside is used and the transmission of the light is controlled for display, are classified into transmission type display devices using transmitted light and reflection type display devices, using reflected light.

The transmission type display device is a device in which a backlight is arranged at the back of the above-mentioned display element and illuminating light from the backlight is used to perform display. The illuminating light from the backlight is emitted toward the display element and then the light is emitted ahead of the display element to perform the display. In this transmission type display device, a large electric power is consumed to turn on the backlight.

The reflection type display device is a device in which ambient light (outer light), which is light in the use environment of the display device, is used for display. The ambient light incident from the front of the display element is reflected toward the display element on a reflector arranged at the back of the display element and then the light is emitted ahead of the display element to perform the display. In this reflection type display device, reflection light having an intensity according to the outer light incident from the front of the display element can be obtained. Therefore, if the device is in the environment wherein enough outer light is present, display can be observed with sufficient brightness. Any backlight is unnecessary so that a little electric power is consumed.

However, in the reflection type display device, the intensity of the reflected light that is emitted ahead of the display element greatly depends on the intensity of the outer light incident from the front of the display element. Consequently, in the environment of a high illumination over 100000 luxes, for example, in the environment under the direct rays of the sun in summer, the screen is too dazzling so that its display is hard to watch. Moreover, in dark environments, such as the open air at night, such a screen brightness in which display can be recognized cannot be obtained. Thus, the device cannot be used in the dark environments.

On the other hand, hitherto reflection type display devices having an auxiliary light source have been proposed in order that their display can be observed in dark environments such as the open air at night.

This reflection type display device having an auxiliary light source is a device in which a semi-transmission reflector is arranged at the back of a display element and the auxiliary light source is arranged at the back of the semi-transmission reflector. As the semi-transmission reflector, a reflector having a high reflectivity and a low transmissivity is used in order to ensure a sufficiently high reflectivity of the display device (the ratio of the intensity of emitted light which is reflected on the reflector and emitted ahead of the display element to that of ambient light incident from the front of the display element).

However, in this reflection type display device having the auxiliary light source, the transmissivity of the semi-transmission reflector is very small, and the luminous brightness of the auxiliary light source cannot be made extremely high to make its consumed electric power small. Therefore, when the auxiliary light source is turned on, the brightness of the illuminating light which is transmitted through the semi-transmission reflector and projected into the display element is weak.

For this reason, in the reflection type display device having the auxiliary light source, its screen brightness is low when the auxiliary light source is turned on in dark environments. Furthermore, in the environment of an intense illumination, such as the environment under direct rays of the sun in summer, its screen is too dazzling so that its display is hard to watch.

BRIEF SUMMARY OF THE INVENTION

An object of this invention is to provide a liquid crystal display element making it possible to obtain a display having a suitable screen brightness in various environments from a bright environment to a dark environment.

Another object of this invention is to provide a display device using illuminating light based on ambient light (outer light) and illuminating light based on a turned-on light source to perform display having a suitable screen brightness according to the environmental illumination in the surroundings.

In order to attain the objects, a first aspect of this invention is a display device comprising:

a non light-emitting type display element for controlling the transmission of incident light to display an image, a light radiating unit arranged at the back of the display element for emitting illuminating light toward the display element and reflecting ambient light incident from the front of the display element at a given reflectivity toward the display element, and an illumination brightness controller for controlling the intensity of the illuminating light so that the screen brightness of the display element comprising the total of reflected light of the ambient light reflected on the light radiating unit and transmitted light of the illuminating light is set up into a predetermined brightness range according to the reflectivity of the light radiating unit and the environmental illumination of the ambient light incident from the front of the display element.

In such a display device of the first aspect, it is possible to emit both of the reflected light of the ambient light and the transmitted light of the illuminating light ahead from the screen of the display element. At bright environmental illuminations, by adjusting the intensity of the illuminating light in accordance with the illumination of the ambient light, consumed electric power by the environmental illuminating light can be reduced, and the ambient light can be used to obtain a bright screen. At dark environmental illuminations, the screen having a sufficient brightness can be obtained by the reflected light of the ambient light and emission of the transmitted light of the illuminating light from the screen of the display element.

In the display device of the first aspect, the illumination brightness controller controls the screen brightness, according to the environmental illumination, to the brightness corresponding to curves represented by quadratic functions satisfying the following ranges:

a screen brightness of 20–200 nits at an environmental illumination of 50 luxes, a screen brightness of 30–300 nits at an environmental illumination of 1000 luxes, and a screen brightness of 400–4000 nits at an environmental illumination of 30000 luxes.

Desirably, the illumination brightness controller controls the screen brightness, according to the environmental illumination, to the brightness corresponding to curves represented by quadratic functions satisfying the following ranges:

- a screen brightness of 20–60 nits at an environmental illumination of 50 luxes,
- a screen brightness of 60–200 nits at an environmental illumination of 1000 luxes, and
- a screen brightness of 1000–3000 nits at an environmental illumination of 30000 luxes.

In the display element wherein its screen brightness is controlled in such a way, even at dark environmental illuminations less than 50 luxes, a screen brightness suitable for observation can be obtained. Even at an environmental illumination of 1000 luxes, which is close to the illumination inside a room, a screen brightness suitable for observation can be obtained. Even at an environmental illumination of 30000 luxes, which is close to the illumination in the open air in the daytime, a screen brightness suitable for observation can be obtained.

In the display device of the first aspect, the illumination brightness controller controls the screen brightness, according to the environmental illumination, to satisfy:

$$-2\times10^{-8}\times I^2 + 0.015 \times I + 20 < L < -3\times10^{-7}\times I^2 + 0.113\times I + 150,$$

wherein the environmental illumination is represented by I (luxes) and the screen brightness is represented by L (nits).

Preferably, the illumination brightness controller controls the screen brightness, according to the environmental illumination, to satisfy:

$$-9\times10{-8}\times I^2 + 0.0453\times I + 20 < L < -2\times10^{-7}\times I^2 + 0.0871\times I + 50,$$

wherein the environmental illumination is represented by I (luxes) and the screen brightness is represented by L (nits).

In the display device wherein its screen brightness is controlled in such a way, a screen brightness suitable for observation can be obtained, even at dark environmental illuminations, in addition, even at an environmental illumination which is close to the illumination inside a room, and even at an environmental illumination which is close to the illumination in the open air in the day time.

In the display device of the first aspect, the illumination brightness controller controls the brightness of the illuminating light from the light radiating unit at an environmental illumination that is, at lowest, higher than the illumination inside a room, and preferably, the illumination brightness controller controls the brightness of the illuminating light from the light radiating unit in the range in which the environmental illumination is from not more than 50 luxes to more than about 30000 luxes.

In the display device wherein its screen brightness is controlled in such a way, the brightness of the illuminating light from the light radiating unit is made small at environmental illuminations more than indoor illumination, so that the electric power consumed by the illuminating light can be reduced in bright environments.

In the display device of the first aspect, the illumination brightness controller controls the brightness of illuminating light from the light radiating unit in a manner that, within the illumination range in which the environmental illumination is lower than indoor illumination, the brightness of the illuminating light is continuously lowered as the environmental illumination becomes low.

In the display element wherein its screen brightness is controlled in such a way, within the illumination range in which the environmental illumination is lower than indoor illumination, the brightness of the illuminating light from the light radiating unit is raised, in order to supplement the decrease in the brightness of the illuminating light, as the environmental illumination is reduced. Thus, a screen brightness suitable for observation can be obtained.

In the display device of the first aspect, the illumination brightness controller controls the brightness of illuminating light from the light radiating unit in a manner that, within the illumination range in which the environmental illumination is higher than indoor illumination and is not more than a given illumination, the brightness of the illuminating light is continuously raised as the environmental illumination rises and, When the environmental illumination exceeds the given illumination, the brightness of the illuminating light is continuously lowered as the environmental illumination further rises.

In the display device wherein its screen brightness is controlled in such a way, within the illumination range in which the environmental illumination is higher than the indoor illumination and is not more than the given illumination, the brightness of the illuminating light is continuously raised to increase the screen brightness. When the environmental illumination exceeds the given illumination, the brightness of the illuminating light is continuously lowered. Thus, it is possible to adjust consumed electric power of the illumination light necessary for obtaining a sufficient screen brightness.

In the display device of the first aspect, the illumination brightness controller controls the brightness of illuminating light from the light radiating unit in a manner that:

1) within the illumination range in which the environmental illumination is lower than indoor illumination, the brightness of the illuminating light is continuously lowered as the environmental illumination becomes low;
2) within the illumination range in which the environmental illumination is higher than the indoor illumination and is not more than a given illumination, the brightness of the illuminating light is continuously raised as the environmental illumination rises,
3) when the environmental illumination exceeds the given illumination, the brightness of the illuminating light is continuously lowered as the environmental illumination further rises.

In the display element wherein its screen brightness is controlled in such a way, within the illumination range in which the environmental illumination is lower than indoor illumination, the brightness of the illuminating light is continuously lowered. Thus, it is avoided that the screen brightness becomes too bright. Within the illumination range in which the environmental illumination is higher than the indoor illumination and is not more than the given illumination, the brightness of the screen brightness is raised according to the rise in the environmental illumination. When the environmental illumination exceeds the given illumination, the brightness of the illuminating light can be reduced by the increased ambient light. Thus, consumed electric power can be reduced.

In the display device of the first aspect, the illumination brightness controller has an illumination detector for measuring the environmental illumination, and a light source brightness adjusting circuit for controlling the brightness of illuminating light emitted from the light radiating unit on the basis of the measured environmental illumination.

In the display device of a second aspect, the light radiating unit has a means for radiating illuminating light onto the display element, and a means for reflecting ambient light projected from the front of the display element and reflecting the reflected light onto the display element.

In the display device of the second aspect, the light radiating unit comprises:
1) a light source, and
2) a photoconductor in which formed are at least one end face in which the light source is arranged opposed thereto, an emitting face for guiding the illuminating light from the light source and emitting the light toward the display element, and a reflective face, which are different from the emitting face, for reflecting ambient light which is projected from the front of the display element toward the display element.

In the display device of the second aspect, the light radiating unit is composed of a light source, a photoconductor wherein the light source is arranged at least one end thereof, and an optical member arranged at the front aide of the photoconductor,
1) the photoconductor comprises an incident end face, as at least end face, for taking in illuminating light form the light source, and a front face made up to a stepwise face comprising step faces which become lower stepwise from the side of the incident end face to the other side and step-level-difference faces each of which connects the step faces,
    reflective films for reflecting the ambient light are deposited on the respective step faces of the photoconductor, and emitting faces for emitting the ambient light projected from the incident end face are formed in the respective step-level-difference faces, and
2) the optical member comprises an element which is arrange at the front side of the photoconductor and is for transmitting the ambient light projected from the front of the display element and emitting the reflected light of the ambient light which is reflected on the reflective films on respective the step faces of the photoconductor and the illuminating light emitted from the respective step-level-difference faces of the photoconductor toward the display element to convert the advancing direction of the light.

In the display element having such a light radiating unit, both of the reflected light of the ambient light projected from the front of the display element and the illuminating light from the light source can be emitted ahead of the display element.

The optical member is made of a transparent plate comprising a front face, opposed to the display element, for emitting light and a back face opposed to the front face of the photoconductor, and projection-form incident portions are formed at the back face of the optical member, the incident portions having an incident face for taking in light emitted from the respective step-level-difference faces of the photoconductor and a refractive face for reflecting or refracting light taken in from the incident face toward the front.

The respective incident portion of the photoconductor are disposed to leave spaces between each other, and back areas between the adjacent incident portions are make up to incident/emitting faces for transmitting the ambient light projected from the front of the display element and the reflected light of the ambient light reflected on the reflective faces on the respective step faces of the photoconductor.

According to such a light radiating unit, it is possible to emit the illuminating light from the light source from the step-level-difference faces of the photoconductor and subsequently refract the light through the optical member so as to be supplied ahead of the display element, and further it is possible to reflect the ambient light projected from the front of the display element on the reflective faces of the respective step faces of the photoconductor to be supplied ahead of the display element.

In the display device of the second aspect, the back face of the photoconductor of the light radiating unit is made up to a light diffusing face for averaging the brightness distribution, in the width direction of the photoconductor of the illuminating light projected from the incident end face.

In the display device of the second aspect, a light diffusing film is disposed between the light radiating unit and the display element.

By disposing the light diffusing film in such a way, the reflected light of the ambient light emitted from the light radiating unit and the illuminating light from the light source can be diffused and projected into the display element. Thus, a display device having a wide visual field angle can be obtained.

In the display device of the second aspect, a reflecting polarizer is disposed between the light radiating unit and the display element. The reflecting polarizer has a reflection axis and a transmission axis crossing each other at substantially right angles and a property of reflecting incident light of the polarized component along the reflection axis and transmitting incident light of the polarized component along the transmission axis.

The display element comprises a liquid crystal display element having on each of its front and back faces a polarizer, and the reflecting polarizer is arranged so that its transmission axis is substantially parallel to the transmission axis of the polarizer at the back side of the liquid crystal display element.

In the display device wherein the reflecting polarizer having a property of transmitting one component of the polarized components crossing each other at right angles and reflecting the other is arranged in such a way between the light radiating unit and the display element, only the light ray whose direction is consistent with the direction of the transmission axis of the polarizer at the back of the display element, among the illuminating light from the light source, is transmitted through the reflecting polarizer. The other light rays are not absorbed to be scattered and reflected inside the light radiating unit.

In a display device of another embodiment according to the second aspect of this invention, the light radiating unit comprises:
1) a light source,
2) a photoconductor wherein formed are an emitting face for guiding illuminating light form the light source and emitting the light toward the display element, and a transmission face, different form the emitting face, for transmitting ambient light which is projected from the front of the display element, and
3) a back side reflecting means, at the back side opposed to the incident/emitting face of the photoconductor, for reflecting the ambient light toward the side of the transmission face of the photoconductor.

The light radiating unit is composed of a light source, a photoconductor in, which the light source is arranged at least at one end face, a back side reflective means arranged at the back side of the photoconductor, and an optical member arranged at the front side of the photoconductor,
1) the photoconductor comprises an incident end face, as at least end face, for taking in illuminating light form the light source, and a front face made up to a stepwise face comprising step faces which become lower stepwise from the side of the incident end face to the other side and step-level-difference faces each of which connects the step faces, the step-level-difference faces are made up to emitting faces for emitting the illuminating light projected from the incident end face, and the step faces are made up to transmission faces, different from the emitting faces, for transmitting the ambient light projected from the front of the display element, 2) the back side reflecting means is disposed opposed to the step faces of the photoconductor at the back side of the photoconductor, and has reflective faces for reflecting the ambient light which is projected into the step faces of the photoconductor from the front of the display element to emit the light from the step faces, and 3) an optical member, which is arranged at the front side of the photoconductor, allows to transmit the reflected light of the ambient light projected from the front of the display element and the reflected light of the ambient light reflected on the back side reflecting means, and emit the illuminating light emitted from the respective step-level-difference faces of the photoconductor toward the display element.

The light radiating unit has an optical member, which is arranged at the front side of the photoconductor, for transmitting the ambient light projected from the front and the reflected light of the ambient light which is reflected on the back side reflecting means and emitted from the step faces of the photoconductor and emitting the illuminating light which is emitted from the step-level-difference faces of the photoconductor ahead in a given direction.

In the display device using such a light radiating unit, it is possible to emit the illuminating light from the light source from the step-level-difference faces of the photoconductor and subsequently refract the light through the optical member so as to be supplied ahead of the display element, and further it is possible to transmit the ambient light projected from the front of the display element through the transmission faces on the respective step-level-difference faces of the photoconductor and reflect the light on the back side reflecting means at the back side of the photoconductor to be supplied ahead of the display element.

In the display element of the display device of a third aspect of this invention, among a pair of substrates at the front and back sides opposed to each other through a liquid crystal layer, one substrate has on its inner face first electrodes, and the other substrate has on its inner face at least one second electrode whose portion opposite to the first electrodes are made up to pixel areas, and a color filter having a smaller area than the area of the pixel area is disposed on an interface of either of the substrate, corresponding to each of the pixel areas.

The pixel areas of the liquid crystal display element have a filter-corresponding area covered with a color filter having a smaller area than the pixel area, and a non-filter area arranged around the filter-corresponding area and not covered with the color filter.

In the display device using such a liquid crystal display element, a part of the ambient light projected from its front face is transmitted through the non-filter areas, reflected, and again transmitted through the non-filter areas, so that reflected light having a high brightness can be obtained. Furthermore, the ambient light projected from the front face of the liquid crystal display element is seldom transmitted through the respective filter-corresponding areas in the adjacent pixel areas. Therefore, the light is not transmitted through the color filters in the different colors, so that a large brightness without mixed colors can be obtained.

The display device of a fourth aspect of this invention is composed of a non light-emitting type display element, a transmission display system comprising a light radiating unit, which is arranged at the back of the display element, for emitting illuminating light toward the display element, a reflection display system for reflecting the ambient light projected from the front of the display element on the light radiating unit and emitting the light ahead of the display element, and a screen brightness compensating display system for emitting the illuminating light from the light radiating unit and compensating the screen brightness of the display element based on the reflection display system by the emitted illuminating light, wherein the reflectivity of the ambient light in the reflection display system is about 16% or more when the transmissivity of the display element is controlled to the maximum.

The reflection display system has a reflectivity of 70% when the aperture ratio of the display element is set to 100%, the display element has an aperture ratio of about 60% or more, and the reflection display system has a color filter having a transmissivity of 36%.

The reflectivity of the ambient light in the reflection display system is 20% or more.

The display device of the fourth aspect makes it possible to efficiently reflect the ambient light projected from the front, toward the front. Thus, if the environmental illumination is more than a given illumination, a sufficient screen brightness can be obtained by only the illuminating light based on the reflected light of ambient light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Liquid crystal display devices will be described below as embodiments of the present invention with reference to the accompanying drawings.

First Embodiment

Figure 1:
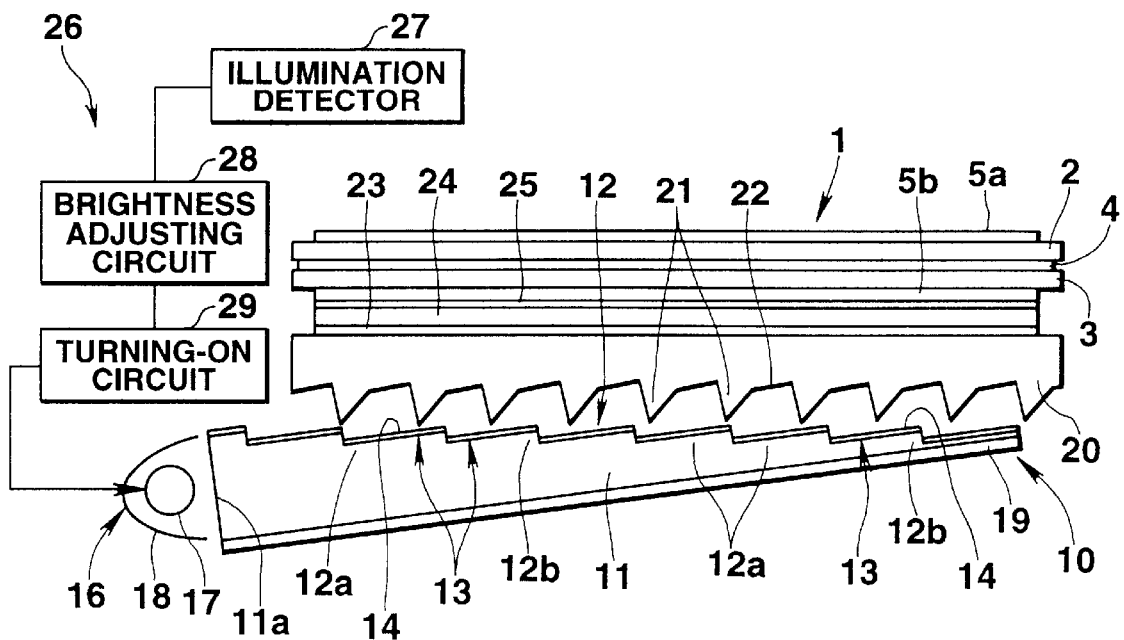
FIG. 1 is a cross section view illustrating a part of a display device using a lighting panel according to a first embodiment of this invention.

FIG. 1 is a side view of a display device according to the first embodiment of this invention. The display device of this embodiment is a device using a liquid crystal display element as a non light-emitting type display element in which ambient light incident from the outside is used and the transmission of the light is controlled to perform display.

This display device has a liquid crystal display element 1, a light radiating unit (a light radiating means) 10, arranged at the back of this liquid crystal display element 1, for emitting illuminating light toward the back face of the liquid crystal display element 1 and reflecting ambient light (outer illuminating light) projected from the front of the liquid crystal display element 1 toward the back side of the liquid crystal display element 1, and an illumination brightness controller (or an illuminating brightness controlling means) 26 for controlling the brightness of the illuminating light according to illuminations of environments wherein the display element is used.

Figure 2:
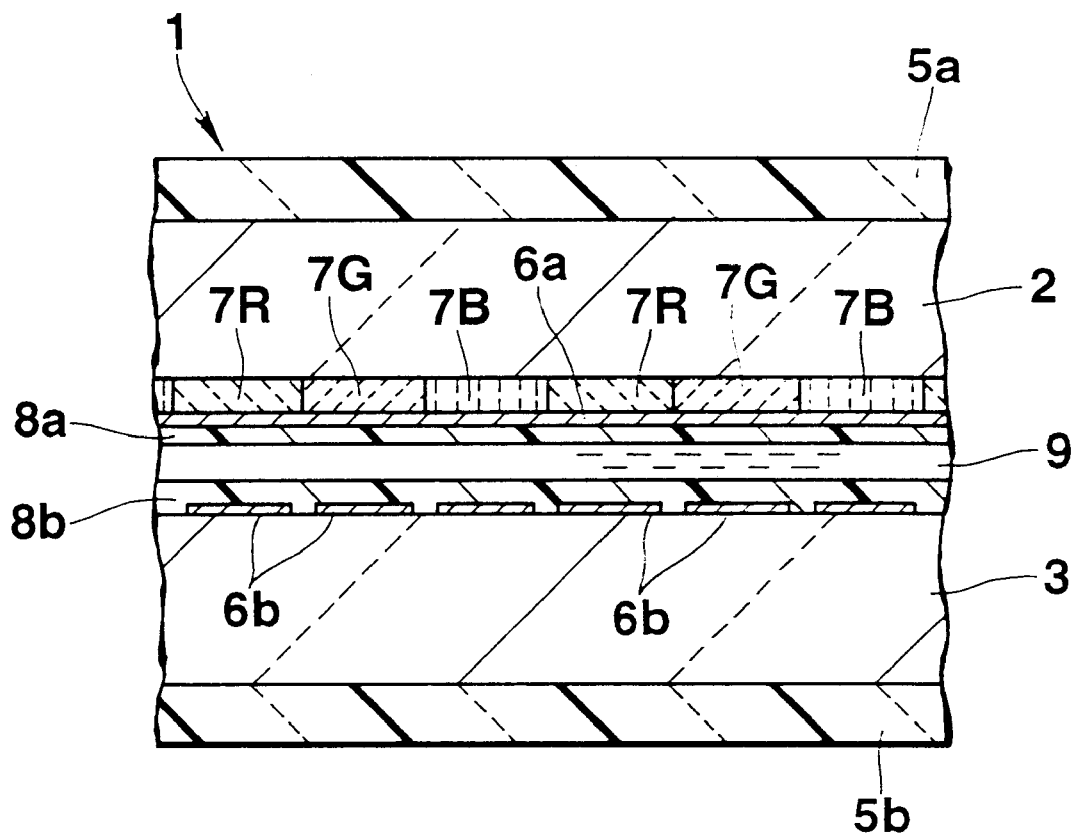
FIG. 2 is an enlarged cross section view illustrating a part of a display element of the first embodiment.

FIG. 2 is an enlarged cross section view of a part of the liquid crystal display element 1. This liquid crystal display element 1 has a structure wherein transparent electrodes 6a and 6b in which plural pixel areas are made by areas opposite to each other are deposited on respective inner faces of a pair of transparent substrates 2 and 3, at the front and back faces, which are bonded to each other through a frame-form seal material 4 (see FIG. 1); color filters 7R, 7G and 7B in plural colors corresponding to the respective pixel areas, for example, red, green and blue colors, are deposited on the inner face of either one of the substrates, for example, the front side substrate 2; and further a liquid crystal layer 9 is disposed in the area which is enclosed with the seal material 4 and is between the substrates 2 and 3.

This liquid crystal display element 1 is an element of an active matrix system using a TFT (thin film transistor) as an active element. The electrodes 6b disposed on the inner face of the backside substrate 3 are pixel electrodes arranged in a matrix form.

These pixel electrodes 6b are connected to TFTs (not shown) arranged corresponding to the respective pixel electrodes 6b on the inner face of the back side substrate 3, and the TFTs are connected to gate lines and data lines (not shown) wired on the inner face of the back side substrate 3.

The electrode 6a deposited on the inner face of the front side substrate 2 is an opposite electrode, in a single film form, which is opposed to all of the pixel electrodes 6b. This opposite electrode 6a is formed on the color filters 7R, 7G and 7B.

Furthermore, this liquid crystal display element 1 is an element of a TN (twisted nematic) type having polarizers 5a and 5b on its front and back faces. Concerning liquid crystal molecules of the liquid crystal layer 9 disposed between the pair of the substrates 2 and 3, their orientation directions near the respective substrates 2 and 3 are regulated by alignment layers or films 8a and 8b disposed on the inner faces of both the substrates 2 and 3. The molecules are twist-orientated at a given twist angle (for example, about 90 degrees) between both the substrates 2 and 3. The polarizers 5a and 5b are stuck onto the outer faces of the pair of the substrates 2 and 3, respectively, so that their transmission axes are along given directions.

Figure 3:
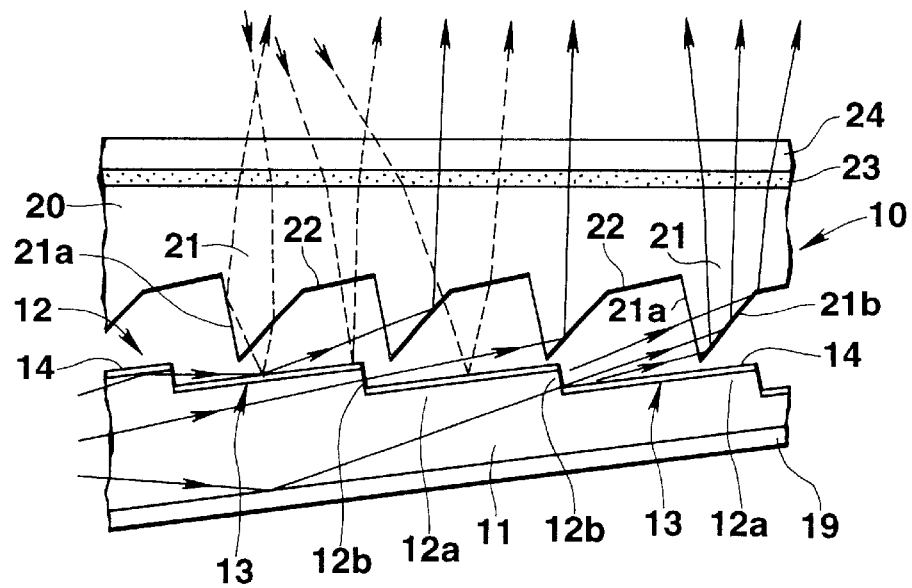
FIG. 3 is an enlarged cross section view illustrating a part of a lighting panel of the first embodiment.
Figure 4:
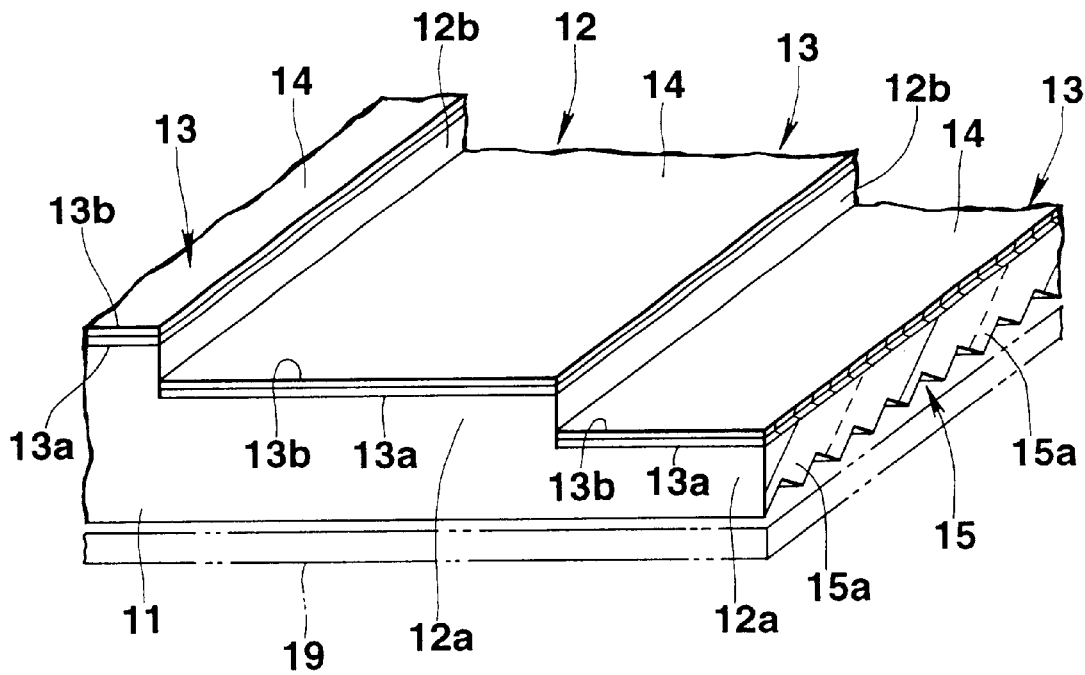
FIG. 4 is a perspective view of a lighting panel of the first embodiment.

FIG. 3 is an enlarged cross section view illustrating a part of a photoconductor 11 and an optical member 20 which constitute the light radiating unit 10 of the display device according to this embodiment. FIG. 4 is an enlarged perspective view of a part of the photoconductor 11.

The light radiating unit 10 has the photoconductor 11 wherein its one end face is made up to a light incident end face 11a and further a reflective face 14 for reflecting ambient light incident from the front of the liquid crystal display element 1 and an emitting face (respective step-level-difference faces 12b of a stepwise face 12 described later, in this embodiment) for emitting illuminating light projected from the incident end face 11a are formed in the front face opposite to the back face of the liquid crystal display element 1; a light source 16 arranged opposed to the incident end face 11a of this photoconductor 11; a mirror reflector 19 arranged to face the back face of the photoconductor 11; and the optical member 20 arranged at the front side of the photoconductor 11.

The photoconductor 11 is a transparent plate made of an acrylic resin or the like. One end thereof is made up to the incident end face 11a for taking in light from the light source 16. Its front face is made up to a stepwise face 12 having a very small pitch and composed of step faces 12a parallel to each other which are formed to become lower stepwise (to make the distance from the back face of the photoconductor smaller) in the direction from the side of the incident end face 11a to the other end face side, and step-level-difference faces 12b for connecting these step faces 12a.

The step-level-difference faces 12b are faces parallel to the incident end face 11a, and each step face 12a between the adjacent step-level-difference faces 12b is a flat face extending along the width direction of the photoconductor 11 (the length direction of the incident end face 11a).

As illustrated in FIG. 4, underlayers 13a made of $SiO_2$ (silicon oxide) are formed on the whole of the respective step faces 12a of this stepwise face 12. A mirror reflective film 13 formed by vapor deposition of a high-reflectivity metal film 13b made of Al or the like is disposed on the entire surface of the underlayer 13a. The surface of this reflective film 13 (the surface of the metal film 13b) becomes the reflective face 14 for reflecting ambient light projected from the front of the liquid crystal display element 1.

The underlayer 13a made of $SiO_2$ is formed to raise the adhesion between the photoconductor 11 made of an acrylic resin or the like, and the metal film 13b made of aluminum or the like.

The respective step-level-difference faces 12b of the stepwise face 12 are made up to light transmitting faces on which any reflective film is not formed. These step-level-difference faces 12b are made up to emitting faces for emitting illuminating light projected from the incident end face 11a.

As illustrated in FIG. 4, the back face of this photoconductor 11 is made up to a light diffusing face 15 for averaging the brightness distribution in the width direction of the photoconductor of the illuminating light projected from the incident end face 11a.

This light diffusing face 15 has a shape in which elongated prism portions 15a, which have a length over the whole length of the photoconductor 11, are formed in parallel to continue in the width direction of the photoconductor 11 at a very small pitch. The reflector 19 is arranged in such a manner that its reflective face approaches or contacts the top face of the prism portions 15a.

The light source 16 is composed of, for example, a straight tube form fluorescent lamp 17 having a length over the whole length of the incident end face 11a of the photoconductor 11, and a reflector 18 for reflecting light emitted from this fluorescent lamp 17. This light source 16 is arranged at the side of the photoconductor 11 opposed to its incident end face 11a.

The optical member 20 has a characteristic that the light incident from the front thereof is transmitted and emitted toward the back face thereof, the light which is reflected on reflective faces 14 (the surfaces of the reflective films 13) on the respective step faces 12a of the photoconductor 11 and is projected from the back face of this optical member 20 is transmitted and emitted toward the front face thereof, and the illuminating light which is emitted from the respective step-level-difference faces (the emitting faces) 12b of the photoconductor 11 is taken in from the back face thereof and emitted ahead.

This optical member 20 is formed by a transparent plate made of an acrylic resin or the like and having substantially the same width as that of the photoconductor 11. Its front face is made up to a flat face. The following is integrated with its back face: incident portions 21 for taking in the light emitted from the respective step-level-difference faces 12b of the stepwise face 12 of the photoconductor 11.

The incident portions 21 are made up to long sideways projections having a length over the whole longitudinal of the width of the optical member 20. The optical member 20 is arranged in a manner that the longitudinal direction of the respective incident portions 21 at the back face side of the member 20 is substantially parallel to the longitudinal direction of the respective step-level-difference faces 12b of the photoconductor 11 and further the top faces of the respective incident portions 21 approach or contact the respective step faces 12a of the photoconductor 11.

The incident portions 21 have a sectional shape of a triangle. The interface between one side face opposite to the step-level-difference face 12 of the photoconductor 11 among both side faces of the respective incident portions 21 and the open air is made up to an incident face 21a for taking in the light emitted from the step-level-difference face 12b. The interface between the other side face and the open air is made up to a refractive face 21b for reflecting or refracting the light taken in from the incident face 21a toward the front face of the optical member 20.

The incident face 21a is a flat face which has an inclination substantially parallel to the step-level-difference face 12b of the photoconductor 11 or an inclination similar thereto, and has an angle (an angle in the direction opposite to the step-level-difference face 12) of less than 90 degrees to the step face 12a of the photoconductor 11.

The refractive face 21b is made up to an inclined flat face having such an inclination angle that the angle between the refractive face 21b and the normal of the front face of the optical member 20 is larger than the angle between the incident face 21a and the normal.

The shape of the incident portion 21 is more desirably a shape that the incident face 21a is inclined, in the direction along which the incident face 21a opposes to the step-level-difference face 12b of the photoconductor 11, to the normal at an angle of 5–15 degrees and the refractive face 21b is inclined, in the reverse direction, to the normal at an angle of 20–50 degrees.

The incident portions 21 are arranged to leave spaces between the respective incident portions 21 at a constant pitch. The interface between the open air and the back face between the adjacent incident portions 21 is made up to an incident/emitting face 22 opposite to the reflective face 14 on each of the step faces 12a of the photoconductor 11.

This incident/emitting face 22 is a flat face having an inclination substantially parallel to the step face 12a of the photoconductor 11 or an inclination similar thereto, and is an optical interface for transmitting the light which is projected from the front of the liquid crystal display element 1 and reflected on the reflective face 14 on each of the step faces 12a of the photoconductor 11.

The incident portions 21 are arranged at a pitch different from that of the respective step-level-difference faces 12b of the photoconductor 11. As illustrated in FIGS. 1 and 3, in this embodiment, the respective incident portions 21 of the optical member 20 are arranged at a pitch that is smaller than that of the respective step-level-difference faces 12b of the photoconductor 11 and is larger than a half of the pitch of the respective step-level-difference faces 12b. Therefore, each of the step-level-difference faces 12b of the photoconductor 11 is necessarily opposite to at least one incident portion 21 of the optical member 20.

In this display device of the embodiment, the light radiating unit 10 composed of the photoconductor 11, the light source 16 arranged opposed to the incident end face 11a of the photoconductor 11, and the optical member 20 arranged at the front face side of the photoconductor 11 is arranged at the back of the liquid crystal display element 1 so that the side at which the light source 16 is arranged is directed to the direction along which ambient light is mainly taken in.

That is, this display device is a device in which the direction of its screen is selected for use in such a manner that the direction inclined toward the upper edge side of the screen (the left upward direction in FIG. 1), to the normal of the screen is set up to a main light taking-in direction in the environment wherein ambient light can be obtained, in the same way as in usual reflection type display devices.

As illustrated in FIG. 1, in the display device of the embodiment, the light diffusing film 23 and the reflecting polarizer 24 having the following property are arranged in a laminating manner between the light radiating unit 10 and the liquid crystal display element 1.

Figure 5:
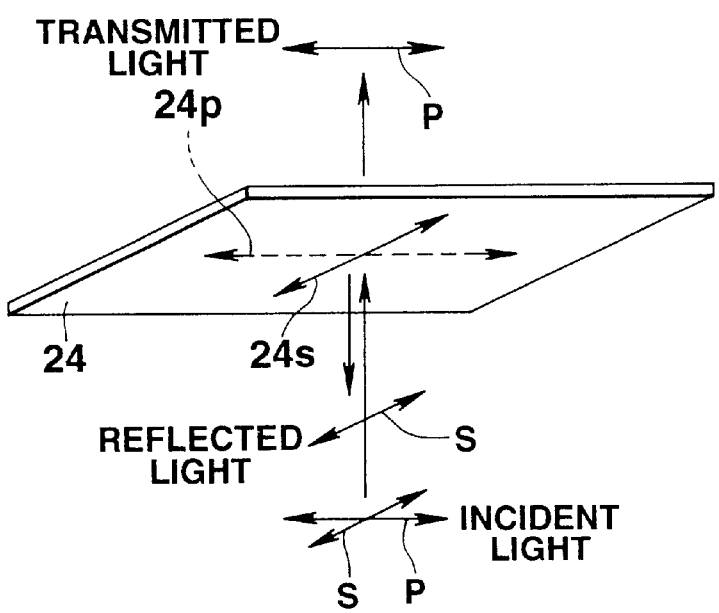
FIG. 5 is a perspective view illustrating an optical path of a reflecting polarizer used in the lighting panel of the first embodiment.

FIG. 5 is a perspective view of the reflecting polarizer 24. The reflecting polarizer 24 has a reflection axis 24s and a transmission axis 24p which cross each other at substantially right angles. The polarizer 24 has a property that the incident light of the polarized component along the reflection axis 24s is reflected and the incident light of the polarized component along the transmission axis 24p is transmitted.

That is, as shown in FIG. 5, when light containing both light S of the polarized component along the reflection axis 24s (referred to as an S polarized light component hereinafter) and light P of the polarized component along the transmission axis 24p (referred to as a P polarized light component hereinafter) is projected into the reflecting polarizer 24, the light S of the S polarized light component along the reflection axis 24s among the above-mentioned incident light is reflected on the reflecting polarizer 24 and the light P of the P polarized light component along the transmission axis 24p is transmitted through the reflecting polarizer 24.

FIG. 5 shows an example wherein light is projected into the reflecting polarizer 24 from its back side. The reflecting polarizer 24 is a non-colored sheet having a property that its reflection property and its refractive property do not depend on wavelengths.

The reflecting polarizer 24, the structure of which is not illustrated, is, for example, a plate wherein a pair of transparent films, one face of each of which is made up to an uneven surface having a form that long sideways prism portions having a fine width are continuously arranged in parallel and in their width direction, are overlapped so that respective top portions of the uneven surface of the one film are opposite to respective valley portions of the uneven surface of the other film, and further a laminating film wherein transparent layers having different refractive indexes are alternately laminated is put between the uneven surfaces of both the films. This type reflecting polarizer is disclosed in U.S. Pat. Nos. 5,422,756 and 5,559,634.

In this embodiment, the reflecting polarizer 24 is arranged in a manner that its transmission axis 24p is substantially parallel to the transmission axis of the polarizer 6 at the back side of the liquid crystal display element 1. As shown in FIG. 3, the reflecting polarizer 24 is stuck onto the front face of the optical member 20 of the light radiating unit 10 through the light diffusing film 23.

The light diffusing film 23 is formed by applying a transparent adhesive agent in which light scattering fine particles are dispersed to the substantial whole of the front face of the optical member 20, and the reflecting polarizer 24 is stuck onto the front face of the optical member 20 by adhesion of the light diffusing film 23.

The liquid crystal display element 1 is arranged to overlap with the front face of the reflecting polarizer 24, and its back face (the back face of the back side polarizer 5b) is stuck onto the front face of the light diffusing film 23 by a transparent adhesive agent or a both-face adhesive sheet 25.

In this display device, the liquid crystal display element 1 and the light radiating unit 10 are made up to a reflection display system for reflecting ambient light incident from the front of the liquid crystal display element 1 on the reflective faces 14 formed on the respective step faces 12a of the photoconductor 11 of the light radiating unit 10 so as to be emitted ahead of the liquid crystal display element 1.

Further, a screen brightness compensating display system is made up for causing the light radiating unit 10 to radiate illuminating light, and then using the illuminating light to compensate screen brightness of the liquid crystal display element 1, the screen brightness being based on the reflection display system.

Besides, the following is set up to about 16%: the reflectivity of ambient light when the transmissivity of the liquid crystal display element 1 of the reflection display system is controlled to the maximum value (the ratio of the intensity of the emitted light which is reflected on the light radiating unit 10 and emitted ahead of the liquid crystal display element 1 to the intensity of ambient light projected from the front of the liquid crystal display element 1).

Concerning the reflectivity of ambient light of the reflection display system, when its actual reflectivity is referred to as R (%), the aperture ratio of the liquid crystal display element 1 is set to 100%, and any color filter seems to be not used (that is, the transmissivity of the color filters 7R, 7G and 7B seems to be set to 100%), the following equation (1) represents the relationship among the reflectivity R' (%) of the ambient light in the reflection display system (referred to as a basic reflectivity hereinafter), the transmissivity TCF (%) of the color filters 7R, 7G and 7B, and the actual aperture ration S (%)of the liquid crystal display element 1:

$$R = R' \times S \times T_{CF} \quad (1)$$

The basic reflectivity R' in the reflection display system is decided by the reflectivity of the reflective face 14 of the photoconductor 11 and the transmissivity (the aperture ratio is set to 100%, and no color filters) of the liquid crystal display element 1. The reflective face 14 of the photoconductor 11 is composed of the mirror reflective film 13 formed by vapor deposition of a high-reflectivity metal film 13b made of aluminum or the like, and the liquid crystal display element 1 is a TN type. For these reasons, the basic reflectivity R' can be made up to a relatively high value of about 70% when the transmissivity of the liquid crystal display element 1 of the reflection display system is controlled to the maximum value.

The transmissivity $T_{CF}$ of the color filters 7R, 7G and 7B is a total transmissivity obtained when the light incident into the liquid crystal display element 1 from its front is transmitted through the color filters 7R, 7G and 7B, is reflected on the reflective face 14 of the photoconductor 11, and is again transmitted through the color filters 7R, 7G and 7B. The transmissivity $T_{CF}$ of these color filters 7R, 7G and 7B is about 36%.

In the case that the basic reflectivity R' at the time of controlling the transmissivity of the liquid crystal display element 1 of the reflection display system to the maximum is set to 70% and the transmissivity $T_{CF}$ of the color filters 7R, 7G and 7B is set to 36%, the aperture ratio S of the liquid crystal display element 1 when the reflectivity R of actual ambient light of the reflection display system 16% is about 63% from the equation (1).

Therefore, when the basic reflectivity R' at the time of controlling the transmissivity of the liquid crystal display element 1 of the reflection display system to the maximum is set to 70% and the transmissivity $T_{CF}$ of the color filters 7R, 7G and 7B (the total transmissivity of the transmissivity through the color filters of the light projected from the front of the liquid crystal display element 1 and the transmissivity through the color filters of the light reflected on the reflective face 14 of the photoconductor 11) is 36%, it is sufficient that the aperture ratio of the liquid crystal display element 1 is set to about 60% or more.

Such setting makes it possible that the reflectivity R of ambient light is made up to about 16% or more when the transmissivity of the liquid crystal display element 1 of the reflection display system is controlled to the maximum.

The light radiating unit 10 in this embodiment has an illumination brightness controller 26 for controlling the brightness of illuminating light from the light radiating unit 10 according to the illumination of the environment in which the display device is used. As shown in FIG. 1, this illumination brightness controller 26 is composed of an illumination detector 27 for measuring an environmental illumination, a light source brightness adjusting circuit 28 for controlling the brightness of the illuminating light, which the light radiating unit 10 emits on the basis of the environmental illumination measured with this illumination detector 27, and a light source turning-on circuit 29.

The illumination detector 27 is arranged near the liquid crystal display element 1 in a manner that its receiving face is parallel to the front face of the liquid crystal display element 1, so that the illumination of ambient light incident into the liquid crystal display element 1 from its front is measured as the environmental illumination.

The light source brightness adjusting circuit 28 is a member for adjusting the value of the brightness of the illuminating light incident from the light radiating unit 10 on the basis of the environmental illumination measured with the illumination detector 27, so that the brightness of the screen of the liquid crystal display element 1 is set into the predetermined brightness range according to the environmental illumination. The light source turning-on circuit 29 drives the luminescent lamp 17 of the light source 16 to emit illumination light having a brightness according to the brightness value from the light source brightness adjusting circuit 28.

In this display device, within the range of the environmental illumination wherein the light source 16 is turned on (for example, 0–30000 luxes), display is performed by using both of the reflected light of ambient light reflected on the light radiating unit 10 and illuminating light which the light radiating unit 10 emits. In the case that the environment illumination is about 0 lux, that is, under the environment wherein ambient light can hardly be obtained, display is performed by only the illuminating light which the light radiating unit 10 emits. Under the environment having a high illumination, wherein the light source 16 is not turned on, display is performed by only reflected light of ambient light.

First, the light emitting path of illuminating light from the light radiating unit 10 will be described. As shown by the paths drawn by solid lines with arrows in FIG. 3, illuminating light which is taken in the photoconductor 11 from its incident end face 11a advances inside the photoconductor 11 in its length direction. The light which directly advances toward either of the step-level-difference faces 12b of the stepwise face 12 among the above-mentioned light is emitted from the step-level-difference face 12b. The light other than the light which directly advances toward the step-level-difference face 12b, that is, a light ray which advances toward the step faces 12a of the stepwise face 12 or a light ray which advances toward the back face of the photoconductor 11, is introduced in the photoconductor 11 in its length direction and simultaneously its direction is changed by reflection on the back face of the reflective films 13 on the respective step faces 12a and total reflection on the interface between the back face of the photoconductor 11 and the open air. At last the light is projected into either of the step-level-difference faces 12b and then is emitted from the step-level-difference face 12b.

The light advancing inside the photoconductor 11 toward its back face includes light that is incident onto the interface between the back face of the photoconductor 11 and the open air at a (substantial right) incident angle that is smaller than the critical angle of total reflection. The light is transmitted through the interface and then leaks to the back face of the photoconductor 11. The leaked light is reflected on the reflector 19 arranged at the back of the photoconductor 11 and then is incident onto the photoconductor 11 from its back face. The advancing direction of the light is changed by reflection on the back face of the reflective films 13 on the respective step faces 12a and total reflection on the interface between the back face of the photoconductor 11 and the open air. Thereafter, the light is emitted from any one of the step-level-difference faces 12b. For this reason, almost all of the illuminating light taken in the photoconductor 11 from its incident end face 11a is emitted from the step-level-difference faces 12b without waste.

As described above, the back face of the photoconductor 11 is made up to the light diffusing face 15 having a form wherein the elongated prism-shaped faces 15a are formed in parallel so as to continue in the lateral direction of the photoconductor 11 at a very small pitch. Thus, when the light introduced into this photoconductor 11 is totally reflected on the interface between its back face and the open air, or when the light which leaks to the back face of the photoconductor 11 is reflected on the reflector 19 and again incident into the photoconductor 11 from its back face, the light is diffused and made up to light having a substantially uniform brightness distribution in the width direction of the photoconductor 11. Thus, the light is emitted from the step-level-difference faces 12b.

The illuminating light emitted from the respective step-level-difference faces 12b of the photoconductor 11 is incident into the incident portions 21 formed at the back face of the optical member 20 arranged at the front face side of the photoconductor 11, from its one side face, that is, the incident face 21a.

At this time, each of the step-level-difference faces 12b of the photoconductor 11 is necessarily opposite to at least one incident portion 21 of the optical member 20. Therefore, almost all of the light emitted from the respective step-level-difference faces 12b of the photoconductor 11 is projected into either of the incident portions 21.

As illustrated in FIG. 3, the light emitted from the step-level-difference faces 12b of the photoconductor 11 includes light emitted toward the adjacent step faces 12a. The light is however reflected on the reflective faces 14 on the adjacent step faces 12a and then projected into either of the incident portions 21 of the optical member 20.

The light which is emitted from the respective step-level-difference faces 12b of the photoconductor 11 and incident into the respective incident portions 21 of the optical member 20 is taken in the incident portions 21 from their incident faces 21a, and then is totally reflected on the opposite refractive face 21b so that its direction is changed toward the front face of the optical member 20. The light is transmitted through this optical member 20 and then emitted from its front face.

The illuminating light emitted from the front face of this optical member 20 is light which is projected into the respective incident portions 21 from the incident faces 21a and reflected or refracted on the refractive (or reflecting) faces 21b to be concentrated in a given direction, and which has a brightness distribution having a high brightness in the given direction. In this case, the inclination angle of the refractive faces 21b of the incident portions 21 is set in a manner that the direction of the light reflected on this refractive faces 21b becomes the front direction (the direction in the vicinity of the normal of the front face of the optical member 20). Therefore, the illuminating light emitted ahead of the optical member 20 is light having a distribution exhibiting the directivity that the brightness in the front direction of this photoconductor 11 is high.

The emission direction of the illuminating light emitted from the front face of this optical member 20 is a direction according to the inclination angle of the refractive (or reflecting) faces 21b of the incident portions 21. When the inclination angle of the refractive faces 21b is within the range of an angle of 20–50 degrees to the normal of the front face of the optical member, the emission direction is closer to the front direction. That is, the light is emitted substantially perpendicularly to the flat emitting face.

The light emitted ahead of the optical member 20, that is, the light emitted from the light radiating unit 10 is transmitted through the light diffusing film 23 to be diffused, and then is transmitted through the reflecting polarizer 24 at the front thereof to be projected into the liquid crystal display element 1 from its back face. In FIG. 3, the diffusion state of the illuminating light transmitted through the light diffusing film 23 is omitted to make this figure simple.

In this case, the light emitted from the light radiating unit 10 is light including light rays of polarized components in various directions. As illustrated in FIG. 5, the reflecting polarizer 24 has a property for reflecting the incident light S of the S polarized component along the reflection axis 24s and transmitting the incident light P of the P polarized component along the transmission axis 24p. For this reason, the light of the polarized component along the transmission axis 24p of this reflecting polarizer 24, among the light which is emitted from the light radiating unit 10 and diffused by the light diffusing film 23 to be projected into the reflecting polarizer 24, is transmitted through the reflecting polarizer 24 to be projected into the liquid crystal display element 1. The light of the polarized component along the reflection axis 24s of the reflecting polarizer 24 is reflected on this reflecting polarizer 24.

The light reflected on the reflecting polarizer 24, the path of which is not illustrated, is transmitted through the optical member 20 of the light radiating unit 10 and then reflected on the reflective faces 14 disposed on the respective step faces 12a of the photoconductor 11, so that the light is again transmitted through the optical member 20, with its polarization direction being changed to some degree, and is projected into the reflecting polarizer 24. The light of the polarized component along the transmission axis 24p of the reflecting polarizer 24, among the above-mentioned light, is transmitted through this reflecting polarizer 24 and projected into the liquid crystal display element 1. The light of the polarized component along the reflection axis 24s of the reflecting polarizer 24 is again reflected on this reflecting polarizer 24.

The subsequent process is the repetition of the above. Therefore, the polarization direction of the light of the polarized component along the reflection axis 24s of the reflecting polarizer 24, among the illuminating light from the light radiating unit 10, is changed by the repetition of the reflection on the reflecting polarizer 24 and the reflection on the light radiating unit 10 (the reflection on the reflective films 14 on the respective step faces 12a of the photoconductor 11), so that sooner or later the light becomes light of the polarized component along the transmission axis 24p of the reflecting polarizer 24. The light is transmitted through the reflecting polarizer 24 and projected into the display element. For this reason, almost all of the illuminating light from the light radiating unit 10 can be projected into the liquid crystal display element 1 without waste.

The light advancing toward the refractive faces 21b having a large inclination angle of the respective incident portions 21 at the back face of the optical member 20 and the incident/emitting faces 22 between the adjacent incident portions 21, among the light which is reflected on the reflecting polarizer 24 and then projected into the optical member 20 from its front face, is transmitted through these incident faces 21a and the incident/emitting faces 22 and then emitted toward the back face. The light advancing toward the incident faces 21a, having a small inclination angle of the incident portions 21 is totally reflected on the incident faces 21a so that its direction is changed. The light is emitted from the refractive faces 21b or the incident/emitting faces 22 to the back face.

The following will describe the path of ambient light projected from the front of the liquid crystal display element 1. The ambient light which is transmitted through the liquid crystal display element 1 and the optical member 20, emitted from its back face and reflected on the reflective faces 14 disposed on the respective step faces 12a of the photoconductor 11 is projected into the optical member 20 from its back face. Almost all of the light is taken in from the refractive faces 21b and the incident/emitting faces 22 of the respective incident portions 21 of the optical member 20 since the angle between the step faces 12a of the photoconductor 11 and the incident faces 21a of the respective incident portions 21 of the optical member 20 is large.

The light taken in from the refractive faces 21b, and the light advancing directly toward the front face of the optical member 20 among the light taken in from the incident/emitting faces 22, are transmitted through the optical member 20 without their direction being changed, and emitted from the its front face. The light advancing toward the incident faces 21a at the opposite side, among the light taken in from the refractive faces 21b, is totally reflected on the incident faces 21a so that its direction is changed to the same direction as that of the light advancing directly from the refractive faces 21b and the incident/emitting faces 22 to the front face of the optical member 20. The light is emitted from the front face of the optical member 20.

For this reason, the light which is reflected on the reflecting polarizer 24 and on the reflective faces 14 on the respective step faces 12a of the photoconductor 11 and then emitted toward the front face of the optical member 20 is also light having a brightness distribution wherein the brightness of the light emitted in the front direction is high.

The illuminating light which is emitted from the front face of the light radiating unit 10 (the front face of the optical member 20), transmitted through the light diffusing film 23 and the reflecting polarizer 24 in this order, and then projected into the liquid crystal display element 1 from its back face is linearly polarized light along the transmission axis 24p of the reflecting polarizer 24. The light is projected into the liquid crystal display element 1 from its back face. Since the transmission axis 24p of the reflecting polarizer 24 and the transmission axis of the back side polarizer 5b of the liquid crystal display element 1 are substantially parallel to each other, almost all of the illuminating light transmitted through the reflecting polarizer 24 is transmitted through the back side polarizer 5b and then projected into the liquid crystal display element 1.

In the step in which the illuminating (the linearly polarized light) light which is transmitted through the back side polarizer 5b and then projected into the liquid crystal display element 1 is transmitted through the liquid crystal layer, the light receives the double refraction,effect (the linearly polarized light) to the orientation state of liquid crystal molecules which is changed by voltages applied to between electrodes formed on the inner faces of both the substrates 2 and 3 of the liquid crystal display element 1, so as to be subjected to optical rotation. In addition, the color filters having plural colors and formed on the inner face of the front side substrate 2 absorb the light having wavelength components within the absorption wavelength band thereof, so that the illuminating light becomes colored light which is colored to the color of the color filters. The light of the polarized component along the transmission axis of the front side polarizer 5a, among the colored light, is transmitted through this front side polarizer 5a so as to be made up to image light. The image light is emitted toward the front face of the liquid crystal display element 1.

As described above, in the environment wherein ambient light can be obtained, this display device is used in a manner that the direction of its screen is selected so that the ambient light is mainly taken in from the direction inclined toward the upper edge side of the screen to the normal of the screen. Therefore, the ambient light is projected mainly from the upper edge side of the screen (the upper edge side of the liquid crystal display element 1) at various incident angles.

Concerning the ambient light which is projected from the front of the liquid crystal display element 1, the light of the polarized component along the absorption axis of the front side polarizer 5*a* is first absorbed into the plate 5*a*. Thus, the ambient light. becomes linearly polarized light along the transmission axis of the front side polarizer 5*a* to be projected into the liquid crystal display element 1.

Concerning the ambient light (the linearly polarized light) which is transmitted through the front side polarizer 5*a* and then projected into the liquid crystal display element 1, the color filters having plural colors and formed on the inner face of the front side substrate 2 absorb the light having wavelength components within the absorption wavelength band thereof, so that the ambient light becomes colored light which is colored to the color of the color filters. In the next step in which the colored light is transmitted through the liquid crystal layer, the light receives the double refraction effect (the linearly polarized light) to the orientation state of liquid crystal molecules which is changed by applied voltages, so as to be subjected to optical rotation. The light of the polarized component along the transmission axis of the back side polarizer 5*b*, among the colored light, is transmitted through this back side polarizer 5*b* so as to be made up to image light. The image light is emitted toward the back face of the liquid crystal display element 1.

The light which is emitted toward the back face of the liquid crystal display element 1 is transmitted through the reflecting polarizer 24 and the light diffusing film 23 in this order, and then projected into the optical member 20 of the light radiating unit 10 from its front face. Since the transmission axis 24*p* of the reflecting polarizer 24 and the transmission axis of the back side polarizer 5*b* of the liquid crystal display element 1 are substantially parallel to each other, almost all of the light transmitted through the back side polarizer 5*b* and then projected into the back face of the liquid crystal display element 1 is transmitted through the reflecting polarizer 24 and then projected into the optical member 20.

In this display device, the light source 16 arranged side of the light radiating unit 10 is arranged in the direction of the upper edge side of the screen, which is a direction along which ambient light is mainly taken in the display device. Therefore, the ambient light projected into the optical member 20 is mainly projected from the direction inclined to the side wherein the light source 16 is arranged.

That is, the ambient light which is projected into the optical member 20 from its front is projected at various incident angles, as shown by broken line arrows drawn in FIG. 3. Among the incident light, the light advancing toward the refractive faces 21*b* having a large inclination angle of the respective incident portions 21 at the back face of the optical member 20 and incident/emitting faces 22 between the adjacent incident portions 21 is transmitted through theses refractive faces 21*b* and incident/emitting faces 22 and then emitted toward the back face. The light is reflected on the reflective faces 14 on the step faces 12*a* of the photoconductor 11.

Among the above-mentioned incident light, the light advancing toward the incident faces 21*a* having a small inclination angle of the incident portions 21, the path of which is not illustrated, is totally reflected on these incident faces 21*b* so that its direction is changed. The light is emitted from the refractive faces 21*b* or the incident/emitting faces 22 to the back face, and then reflected on the reflective faces 14 on the step faces 12*a* of the photoconductor 11.

The photoconductor 11 is a member wherein its front face is made up to the stepwise face 12, the reflective film 13 is formed on the whole surface of the step faces 12*a*, and its surface is made up to reflective face 14. Thus, this photoconductor 11 has a reflection property equivalent to that of usual reflectors wherein their front face is made up to a flat reflective face. Therefore, almost all of the light which is emitted toward the back face of the optical member 20 can be reflected without waste.

The reflected light which is reflected on the reflective face 14 on the respective step faces 12*a* of the photoconductor 11 is taken in the optical member 20 from its back face, and then transmitted through this photoconductor 20, to be emitted from its front face.

At this time, the angle between the step faces 12*a* of the photoconductor 11 and the incident faces 21*a* of the respective incident portions 21 of the optical member 20 is large. Thus, almost all of the reflected light which is reflected on the reflective faces 14 on the step faces 12*a* of the photoconductor 11 is taken in from the reflective faces 21*b* and the incident/emitting faces 22 of the respective incident portions 21 of the optical member 20.

The light taken in from the refractive faces 21*b*, and the light advancing directly to the front face of the optical member 20 among the light taken in from the incident/emitting faces 22 are transmitted through the optical member 20, with their direction being kept, and then emitted from its front face. The light advancing toward the incident faces 21*a* at the opposite side, among the light taken in from the refractive faces 21*b*, is totally reflected on this optical interface 21*a* so that its direction is changed to the direction similar to the direction of the light advancing directly from the refractive faces 21*b* and the incident/emitting faces 22 to the front face of the optical member 20. The light is emitted from the front face of the optical member 20.

For this reason, the reflected light that is emitted toward the front face of the light radiating unit 10 (the front face of the optical member 20) is high-brightness light that the ambient light projected from the front of the liquid crystal display element 1 at various incident angles is concentrated. Accordingly, the reflected light of this ambient light is also light having a brightness distribution in which the brightness of the light emitted in the front direction is high.

That is, the reflected light of the ambient light emitted toward the front face of the optical member 20 is light, having a brightness distribution whose brightness in the front direction is higher, that the light projected from the incident portions 21 and concentrated so as to have a brightness distribution in which the brightness in the front direction is high overlaps with the light projected from the incident/emitting faces 22 and then transmitted toward the front face.

The following will describe the adjustment of the brightness of the screen of the liquid crystal display element 1 in this display device. The liquid crystal display element 1 is a liquid crystal display element irradiated with the light having a brightness obtained by overlap of the reflected light of ambient light incident from the front of the liquid crystal display element 1 and then reflected on the light radiating unit 10 and the illuminating light which is emitted from the light source of the light radiating unit 10 and then projected into the liquid crystal display element 1 from its back face side. The light radiating unit 10 uses the illuminating light based on ambient light (outer light) and the illuminating light based on turning-on of the light source, to control the brightness of the light source so that the screen brightness of the liquid crystal display element, based on the total of these illuminating light rays, becomes an appropriate value (the linearly polarized light) to the illumination of the surrounding use environment. In this case, when the illumination of the use environment is about 0 lx, that is, when ambient light can hardly be obtained, the brightness of the light source of the light radiating unit 10 is controlled to a screen brightness according to the environmental illumination. The liquid crystal display element 1 is irradiated with the illuminating light projected through its back face side from the source light.

When the illumination of the use environment is sufficiently high, the light source of the light radiating unit 10 is turned off to perform reflection type display by the reflection display system. At this time, the consumed electric power of the light radiating unit 10 is zero.

Therefore, according to this display device, both of the display by the reflection display system and the display by the transmission display system using light from the light source are used to make it possible to obtain an appropriate screen brightness according to the environment illumination in use environments having from a low illumination to a high illumination.

Besides, as described above, in this display device the reflectivity of the ambient light when the transmissivity of the liquid crystal display element 1 of the reflection display system is controlled to the maximum is set to about 16% or more and 35% or less. Therefore, the ambient light is effectively used, so that a suitable screen brightness can be obtained and further consumed electric power can be reduced.

The screen brightness of the above-mentioned display device will be described. The screen brightness when illuminating light is emitted from the light radiating unit 10 of this display device can be obtained by the following relationship equation (2):

$$L = I \times R/400 + Br \times T/100 \quad (2),$$

wherein I (luxes, referred to as lx hereinafter) and Br (nits, referred to as nit hereinafter) represent the environment illumination and the brightness of the illuminating light emitted from the light radiating unit 10, respectively; T (%) represents the transimitivity along one direction of the liquid crystal display element 1 having the color filters 7R, 7G and 7B; and R (%) and L (nits, referred to as nit hereinafter) represent the reflectivity of the reflection display system and the screen brightness, respectively.

Therefore, when reflection type display is performed by only the reflection display system, that is, illuminating light is not emitted from the light radiating unit 10 (when the brightness Br of the illuminating light from the light radiating unit 10 is 0 nit), the screen brightness L is as follows:

$$L = I \times R/400$$

In this embodiment, in the case of setting into about 16% or more the reflectivity R of the ambient light when the transmissivity of the liquid crystal display element 1 of the reflection display system is controlled to the maximum, the screen brightness L when reflection type display is performed by only the reflection display system is as follows:

1200 lx when the environmental illumination I is, for example, 30000 lx, and 400 lx when the environmental illumination I is, for example, 10000 lx.

It is in general stated that a preferable screen brightness according to environmental illuminations is about 500 nit or more at an environmental illumination of 10000 lx and it is about 1200 nit or more at an environmental illumination of 30000 lx.

In this display device, at an environmental illumination of less than 3000 lx a preferable screen brightness cannot be obtained by only the reflection type display using ambient light based on the reflection display system. However, at an environmental illumination of 30000 lx or more, a preferable screen brightness of 1200 nit or more can be obtained by only the reflection type display based on the reflection display system.

Therefore, when the illumination of the use environment is 30000 lx or more, in the above-mentioned display device, display with a screen brightness suitable for the environmental illumination can be performed without using illuminating light from light radiating unit 10.

That is, the environmental illumination capable of displaying without using illuminating light can be obtained according to the set value of the reflectivity R of the ambient light when the transmissivity of the liquid crystal display element 1 of the reflection display system is controlled to the maximum.

In this display device of this embodiment, therefore, illuminating light is turned off at an illumination over the environmental illumination decided in accordance with the set value of the reflectivity of the liquid crystal display element while illuminating light is turned on at an illumination below the environmental illumination. Thus, the brightness of the illuminating light is controlled, so that the brightness of the liquid crystal display element surface, based on the total of the reflected light of the liquid crystal display element and the illuminating light, is set within such a range in which exhibits a visually optimum brightness.

Figure 6:
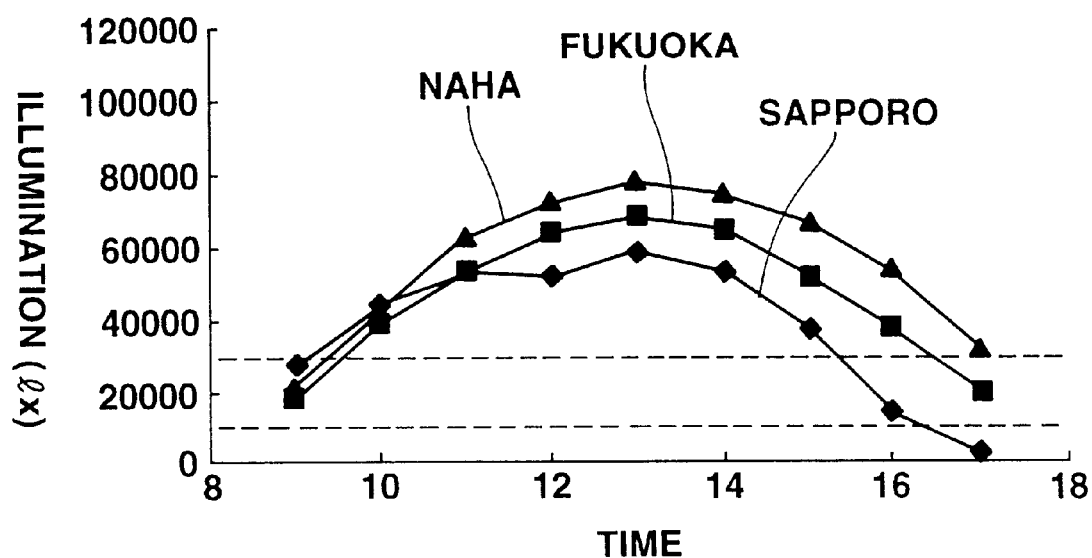
FIG. 6 is a graph showing average illuminations of cities in Japan, i.e., Naha, Fukuoka, and Sapporo cities, at the time of fine weather in January.

FIG. 6 shows the monthly average illumination of every time in the daytime on fine weather days in January in the open air in 3 cities in Japan, that is, Sapporo, Fukuoka and Naha cities. The monthly average illumination in this figure is based on weather data in 1996.

As shown in FIG. 6, the monthly average illumination on fine weather days in January in the open air is 30000 lx or more for more than about 6 hours from about 9:00 to about 15:20 in Sapporo city; is 30000 lx or more for a little less than about 7 hours from about 9:30 to about 16:20 in Fukuoka city, and is 30000 lx or more for a little less than about 8 hours from about 9:20 to about 17:00 in Naha city.

Therefore, when the above-mentioned display device is used in the open air on a fine whether day, display with a screen brightness suitable for the environmental illumination can be performed without using illuminating light from the light radiating unit 10 over a little less than almost all of hours in the day time. In Fukuoka city, display with a screen brightness suitable for the environmental illumination can be performed without emitting illuminating light from the light radiating unit 10 over a little less than 7 hours in the daytime.

In Sapporo city, display with a screen brightness suitable for the environmental illumination can be performed without emitting illuminating light from the light radiating unit 10 over more than 6 hours in the daytime.

In the above-mentioned display device, at the use environment having an illumination of 30000 lx or more, reflection type display is performed without emitting illuminating light from the light radiating unit 10 by the reflection display system. In the case of this reflection type display, however, it is possible to obtain the reflected light having an intensity according to the intensity of the ambient light projected from the front of the liquid crystal display element 1. For this reason, as the environmental illumination rises, the screen brightness also rises so that the screen brightness becomes suitable for the environmental illumination.

As described above, if the reflectivity of the ambient light of the reflection display system is 16% or more, it is possible to obtain a screen brightness suitable for the environmental illumination without emitting illuminating light from the light radiating unit 10 in the use environment having an illumination of less tan 30000 lx. However, if the reflectivity of the ambient light of the reflection display system is too high, the screen becomes dazzling with the rise in the environmental illumination.

For this reason, the reflectivity of the ambient light of the reflection display system is, at highest, 35% or less, and preferably 25% or less. If the reflectivity of the ambient light is in the range of 16–35% (preferably 16–25%), a suitable screen brightness, which is not very dazzling, can be obtained even in the environment having a high brightness over 100000 lx, such as the environment under direct rays of the sun in summer.

On the other hand, in the above-mentioned display device in the use environment having an illumination of less than 30000 lx, its screen brightness is insufficient by only the reflection type display based on the reflection display system. At this time, therefore, the light source 16 of the light radiating unit 10 is turned on to supplement the shortage of the screen brightness based on the reflected light of the ambient light by illuminating light from the light radiating unit 10.

In this case, the brightness of illuminating light emitted from the light radiating unit 10, in this embodiment, is controlled by the illumination brightness controller 26 in accordance with the environmental illumination, so that the screen brightness, based on both of the reflected light of the ambient light projected from the front of the liquid crystal display element 1 and then reflected on the light radiating unit 10 and the illuminating light emitted from the light radiating unit 10 (the screen brightness based on only the illuminating light emitted from the light radiating unit 10 when the environmental illumination is about 0 lx), becomes a screen brightness suitable for the environmental illumination.

That is, in this embodiment, the brightness of the illuminating light from the light radiating unit 10, i.e., the luminous brightness of the fluorescent lamp 17 of the light source 16 is controlled by the illumination brightness controller 26 so that the screen brightness L obtained from the equation (2) of "$L = I \times R/400 + B r \times T/100$" becomes a suitable screen brightness according to the environmental illumination I.

According to this display device, therefore, even in the environment having such an illumination in which a sufficient screen brightness cannot be obtained by display based on only the reflection display system, a screen brightness suitable for its environmental illumination can be obtained.

Figure 7:
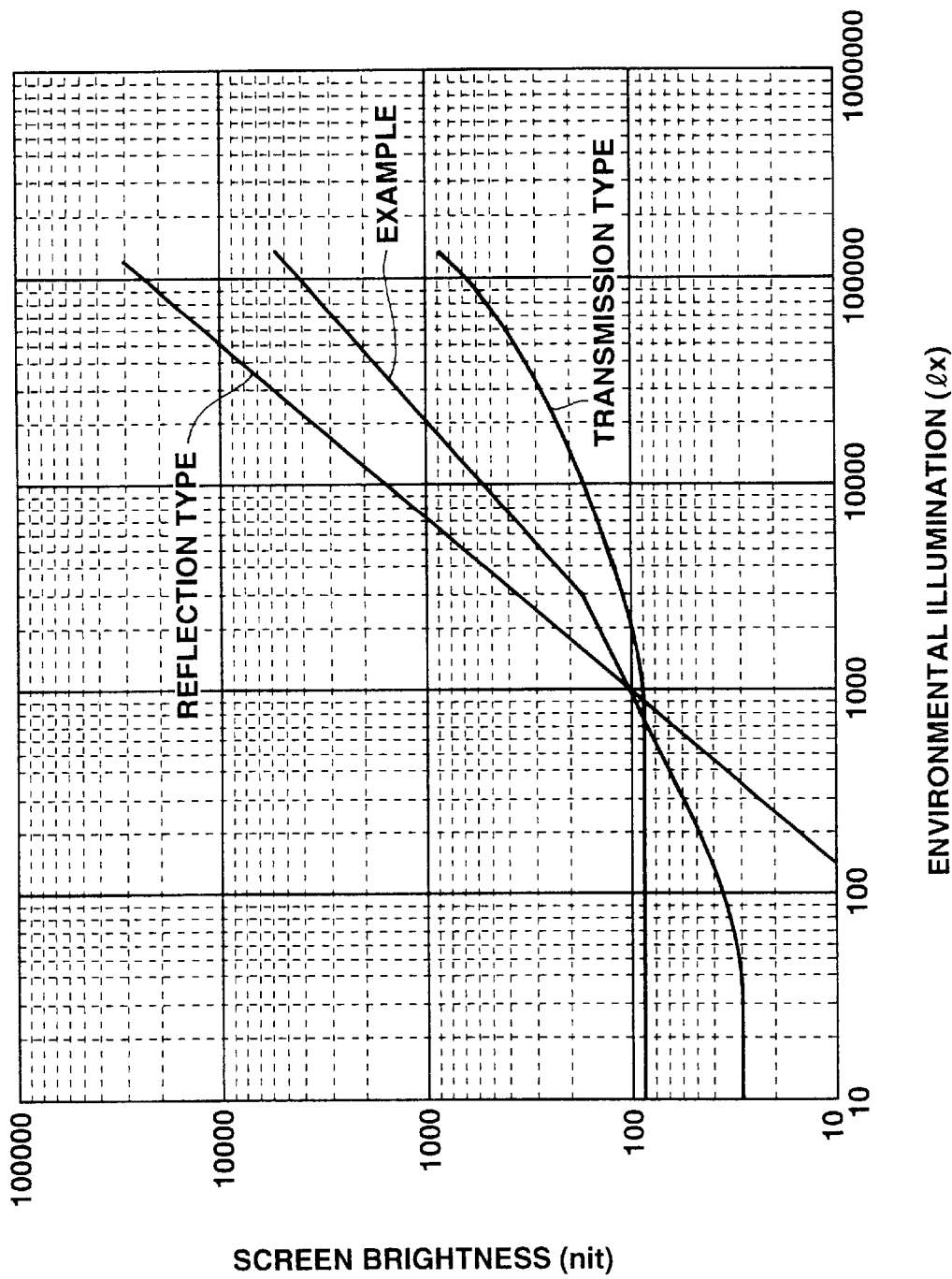
FIG. 7 is a graph showing the relationship between screen brightness L of the display device using the lighting panel of the first embodiment and environment illumination I.

FIG. 7 shows the property between the environmental illumination I and the screen brightness L of the display device of the above-mentioned embodiment wherein the reflectivity of the ambient light of the reflection display system is set to 16%, a conventional reflection type display device wherein a white reflector is arranged at the back of the same liquid crystal display element 1 as used in the above-mentioned display device, and a conventional transmission type display device wherein a back light is arranged at the back of the same as the liquid crystal display element 1.

All of the reflection type display devices and the transmission type display device are designed on the basis of the environmental illumination of about 1000 lx, which is an illumination inside the room when its indoor light is turned on in the daytime or in the nighttime. The screen brightness suitable for the environmental illumination of 1000 lx is about 80 nit or more, and is up to 300 nit in order that the screen is prevented from being excessively dazzling.

In the above-mentioned conventional reflection type display device, therefore, the reflectivity of the ambient light thereof is set so that its screen brightness is from 90 to 150 nit at an environmental illumination of 1000 lx. In the conventional transmission type display device, the back light is controlled so that light having a constant brightness which can constantly give a screen brightness of 90–150 nit is emitted at an environmental illumination of 1000 lx or less while its luminous brightness is raised with the rise in the environmental illumination in the environment that its illumination is at 1000 lx or more.

As understood from the property of the environmental illumination I versus the screen brightness L of the respective display device shown in FIG. 7, in the conventional reflection type display device the screen brightness is appropriate at the environmental illumination of about 1000 lx. However, when the environmental illumination becomes low, the screen brightness becomes too low so that such a screen brightness in which display can be recognized cannot be obtained. Furthermore, when the environmental illumination rises, the screen brightness rises accordingly. Thus, the screen is too dazzling.

In the above-mentioned conventional transmission type display device, suitable screen brightness can be obtained at an environmental illumination of about 1000 lx. However, when the environmental illumination becomes low, the screen brightness is far higher than the environmental illumination so that the screen is dazzling. The luminous brightness of the back light has a limit. Consequently, when the environmental illumination becomes high, the screen brightness becomes insufficient so that the screen gets dark.

On the other hand, the screen brightness of the display device of this invention is as follows: about 30 nit at an environmental illumination of 50 lx, for example, under a streetlight in the nighttime; about 120 nit at an environmental illumination of 1000 lx, for example, inside the room when an indoor light is turned on in the daytime or the nighttime; about 1200 nit at an environmental illumination of 30000 lx, for example, under a tree in a fine weather period; and about 4000 nit at an environmental illumination of 100000 lx, for example under the direct rays of the sun in summer. The screen brightness at any one of the environmental illuminations is within the range of suitable screen brightness, which is sufficient for the environmental illuminations and is not very dazzling.

According to the display device of the above-mentioned embodiment, therefore, in use environments with a wide illumination range having from a low illumination to a high illumination, a screen brightness suitable for the environmental illumination thereof can be obtained.

According to the equation (2), if the illumination of a use environment is 10000 lx or more, 500 nit can be obtained as a screen brightness. Thus, display with a screen brightness suitable for its environmental illumination can be performed without emitting illuminating light from the light radiating unit 10.

Besides, in the case that in the above-mentioned display device the environmental illumination is more than some value (30000 lx or more when the reflectivity of the ambient light of the reflection display system is set to 16%, and 10000 lx or more when the reflectivity of the ambient light of the reflection display system is set to 20%), a screen brightness suitable for its environmental illumination can be obtained without emitting illuminating light from the light radiating unit 10 by only the reflected light of the ambient light.

Accordingly, it is sufficient, in only a use environment having a limited illumination range in which its illumination is not more than some value at which illuminating light is emitted from the light radiating unit 10. Even in the case that the shortage of the screen brightness based on the reflected light of ambient light is supplemented by illuminating light from the light radiating unit 10, the brightness of the illuminating light emitted from the light radiating unit 10 may be relatively low. Thus, it is sufficient that consumed electric power of the light radiating unit 10 is a little.

Furthermore, in the above-mentioned embodiment, the light radiating unit 10 arranged at the back of the liquid crystal display element 1 has a structure having:

the light source 16, and the photoconductor 11 having the emitting faces (the respective step-level-difference faces 12b of the stepwise face 12 of the photoconductor 11) for guiding illuminating light from the light source 16 and emitting the light toward the liquid crystal display element 1, and reflective faces 14, disposed on the respective step faces 12a different from the emitting faces, for reflecting ambient light projected from the front of the liquid crystal display element 1 toward the liquid crystal display element 1.

Therefore, it is possible to select the emitting rate of the illuminating light from the emitting faces (the step-level-difference faces 12b) and the reflectivity of the ambient light on the reflective faces 14, respectively, without any restriction.

Therefore, it is possible to select the reflectivity of the reflective faces to be about 16% or more (more preferably 20% or more) when the emitting rate of the illuminating light from the emitting faces is made high to raise the available efficiency of the illuminating light from the light source 16 and further the transmissivity of the liquid crystal display element 1 of the reflection display system is controlled to the maximum.

In this display device, its screen brightness suitable for environmental illuminations is, for example, as follows:

20–200 nits at an environmental illumination of 50 lx, for example, under a streetlight in the nighttime;

30–300 nits at an environmental illumination of 1000 lx, for example, inside the room when an indoor light is turned on in the daytime or the nighttime; and 400–4000 nits at an environmental illumination of 30000 lx, for example, under a tree in a fine weather period; and more preferably, 20–60 nits at the environmental illumination of 50 lx; 60–200 nits at the environmental illumination of 1000 lx; and 1000–3000 nits at the environmental illumination of 30000 lx.

In this embodiment, therefore, the illumination brightness controller 26 controls the brightness of the illuminating light from the light radiating unit 10 in a manner that, according to environmental illuminations, the screen brightness is in the brightness range corresponding to curves represented by quadratic functions satisfying the following ranges:

20–200 nits at the environmental illumination of 50 lx;

30–300 nits at the environmental illumination of 1000 lx; and

400–4000 nits at the environmental illumination of 30000 lx.

The requirement for controlling the brightness of this illuminating light is a requirement that the value of the screen brightness L (nit) obtained from the equation (2):

$$L = I \times R/400 + Br \times T/100$$

satisfies the following inequality (3) relatively to the environmental illumination I (lx):

$$-2 \times 10^{-8} \times I^2 + 0.015 \times I + 20 < L < -3 \times 10^{-7} \times I^2 + 0.113 \times I + 150 \quad (3)$$

As described above, the screen brightness more suitable for environmental illuminations is 20–60 nits at the environmental illumination of 50 lx; 60–200 nits at the environmental illumination of 1000 lx; and 1000–3000 nits at the environmental illumination of 30000 lx. The requirement for controlling the brightness of this illuminating light is a requirement that the value of the screen brightness L (nit) obtained from the equation (2):

$$L = I \times R/400 + Br \times T/100$$

satisfies the following inequality (4) relatively to the environmental illumination I (lx):

$$-9 \times 10^{-8} \times I^2 + 0.0453 \times I + 20 < L < -2 \times 10^{-7} \times I^2 + 0.0871 \times I + 50 \quad (4)$$

That is, in this embodiment, the brightness of the illuminating light from the light radiating unit 10 is controlled according to the environmental illumination by the illumination brightness controller 26, in a manner that the screen brightness relative to the environmental illumination satisfies the inequality (3), and more preferably the inequality (4).

Figure 8:
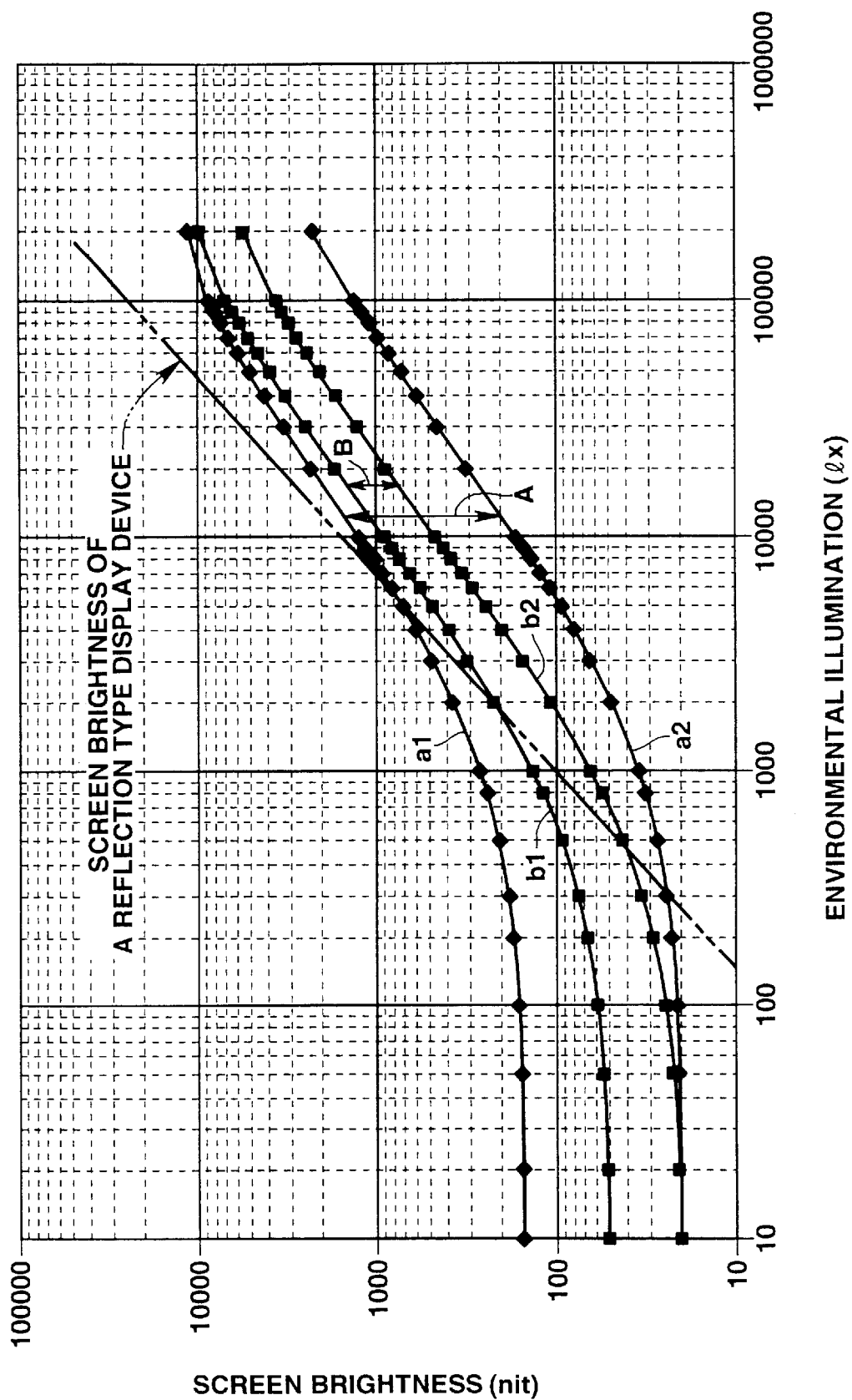
FIG. 8 is a graph showing the relationship between screen brightness L of the display device using the lighting panel of the first embodiment and environment illumination I.

FIG. 8 shows the relationship between the environmental illumination I (lx) and the screen brightness L (nit) suitable for the environmental illumination. In this figure, a1 and a2 represent the maximum value and the minimum value in the range of the screen brightness, which are obtained from the inequality (3), respectively.

That is, a1 is a screen brightness in the case of $L = -3 \times 10^{-7} \times I^2 + 0.113 \times I + 150$, a2 is a screen brightness in the case of $L = -2 \times 10^{-8} \times I^2 + 0.015 \times I + 20$. Any suitable brightness is within the range A between a1 and a2.

In FIG. 8, b1 and b2 represent the maximum value and the minimum value in the range of the screen brightness, which are obtained from the inequality (4), respectively.

That is, b1 is a screen brightness in the case of $L = -2 \times 10^{-7} \times I^2 + 0.0871 \times I + 50$, b2 is a screen brightness in the case of $L = -9 \times 10^{-8} \times I^2 + 0.0453 \times I + 20$. Any more suitable brightness is within the range B between b1 and b2.

When the range A of the suitable screen brightness and the range B of the more suitable screen brightness are compared with the screen brightness of the conventional reflection type display device shown by alternate long and short dashes line in FIG. 8, the screen brightness of the conventional reflection type display device changes linearly in accordance with environmental illuminations.

In this reflection type display device, the range of environmental illumination wherein a suitable screen brightness according to the environmental illumination (the screen brightness in the range A) is obtained is the range of about 300–about 5000 lx, and the range of environmental illumination wherein a more suitable screen brightness (the screen brightness in the range B) is obtained is the range of about 500–about 2000 lx. At an environmental illumination over these values, the screen is too bright. In environments having a high illumination over 100000 lx, for example, under the direct rays of the sun in the open air in summer, the screen is too dazzling so that its display is hard to watch.

At an environmental illumination lower than the range, the screen gets dark. In dark environments, for example, in the open air in the nighttime, such a screen brightness in which display can be recognized cannot be obtained.

In the display device of this embodiment, a suitable screen brightness can be obtained even in dark environments. The reflectivity of the display device may be lower than that of the conventional reflection type display device using only reflected light of ambient light, so that a suitable screen brightness, which is not very dazzling, can be obtained even in environment having a high illumination, for example, under the direct rays of the sun in summer.

In this display device, even when the environmental illumination is about 0 lx, that is, when ambient light can hardly be obtained, illuminating light emitted from the light radiating unit 10 is used to make it possible to perform display having a suitable screen brightness.

Since the reflectivity of the ambient light of the light radiating unit 10 (the reflectivity of the reflective faces 14 on the respective step-level-difference faces 12b of the photoconductor 11) is constant, the brightness of the reflected light of the ambient light is a brightness corresponding to the environmental illumination. This display device comprises the illumination brightness controller 26 for controlling the brightness of the illuminating light correspondingly to the environmental illumination, and sets the reflectivity of the ambient light of the light radiating unit 10 and the requirements for controlling the brightness of the illuminating light based on the illumination brightness controller 26 in a manner that the screen brightness is set within the brightness range predetermined according to the environmental illumination. Thus, in accordance with the environmental illumination, a screen brightness suitable for the environmental illumination can be obtained.

Besides, the brightness of the illuminating light may be such a value that the screen brightness based on both of the reflected light of ambient light and the illuminating light is made up to a brightness suitable for the environmental illumination. Under the condition, the brightness of the illuminating light emitted from the light radiating unit may be controlled. Thus, only a little consumed electric power is necessary in the light radiating unit.

In this display device, therefore, only a little consumed electric power is necessary and further in use environments with a wide illumination range having from a low illumination to a high illumination, a screen brightness suitable for the environmental illumination thereof can be obtained.

Figure 9:
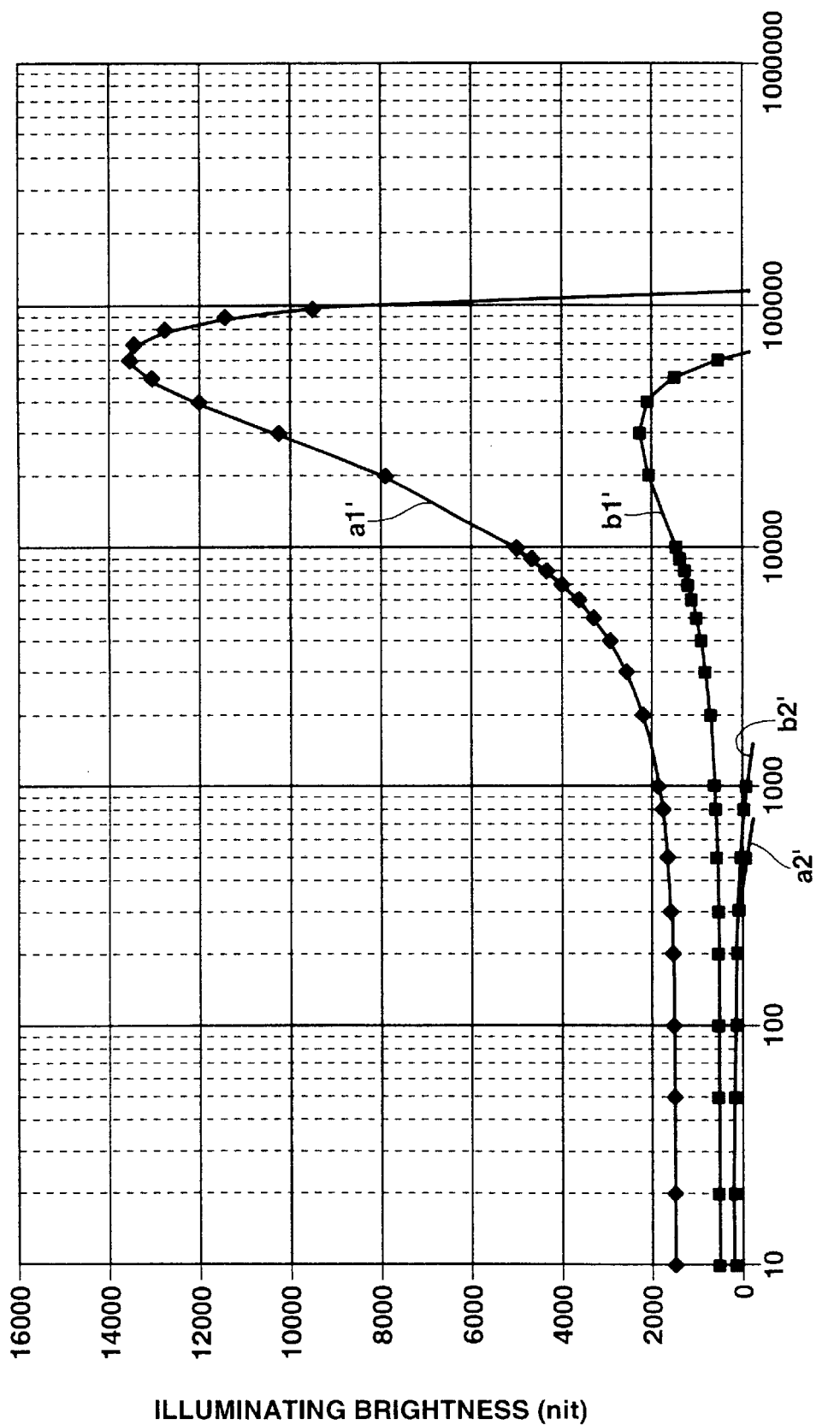
FIG. 9 is a graph showing the relationship between lighting brightness Br based on a light source of the lighting panel of the first embodiment and environment illumination I.

FIG. 9 shows the relationship between the environmental illumination I (lx) and the illuminating brightness Br (nit) on the screen by only illuminating light from the light source of the light radiating unit 10 for obtaining a screen brightness suitable for the environmental illumination I. This figure shows an example of the brightness control of illuminating light based on the light source of the light radiating unit for obtaining the screen brightness suitable for satisfying the inequality (3) or (4) according to the environmental illumination (the screen brightness within the range A or B shown in FIG. 8).

The relationship between the environmental illumination I and the illuminating brightness Br on the screen based on only the illuminating light, shown in FIG. 9, is an example wherein:

the range of the environmental illumination in which illuminating light is used to obtain a screen brightness suitable for satisfying the inequality (3) is set to from 0 to about 120000 lx, the range of the environmental illumination in which illuminating light is used to obtain a screen brightness suitable for satisfying the inequality (4) is set to from 0 to about 63000 lx, the reflectivity of the display device is set in a manner that the screen brightness at a high environmental illumination for performing display based on only the reflected light of ambient light (about 12000 lx to about 6300 lx), with the stop of emission of the illuminating light from the light radiating unit 10, is made up to:

a screen brightness suitable for satisfying the inequality (3) (for example, from about 2200 to about 12000 nit at an environmental illumination of 110000 lx), or a screen brightness suitable for satisfying the inequality (4) (for example, from about 5300 to about 9500 nit at an environmental illumination of 110000 lx).

In FIG. 9, a1' and a2' represent the illuminating brightness based on only illuminating light, for obtaining the maximum value (the brightness of a1 in FIG. 9) and the minimum value (the brightness of a2 in FIG. 9) in the range of the screen brightness obtained from the inequality (3), respectively.

That is, a1' is an illuminating brightness based on only illuminating light for making up the screen brightness L (nit) relative to the environmental illumination I (lx) to $L=-3\times 10^{-7}\times I^2+0.113\times I+150$, and a2' is an illuminating brightness based on only illuminating light for making up the screen brightness L (nit) relative to the environmental illumination I (lx) to $L=-2\times 10^{-8}\times I^2+0.015\times I+20$.

Therefore, the illuminating brightness based on only the illuminating light for obtaining a screen brightness suitable for satisfying the inequality (3) is a brightness within the range between a1' and a2'. As shown in FIG. 9, on the basis of calculation, when the environmental illumination exceeds about 300 lx, the illuminating brightness of a2' becomes 0 nit or less. At the environmental illumination over about 300 lx, the illuminating brightness based on only illuminating light does not become 0 nit or less. Therefore, the range of the illuminating brightness of the illuminating light for obtaining a screen brightness suitable for satisfying the inequality (3) is the brightness range from 0 nit to a1'.

In FIG. 9, b1' and b2' represent the illuminating brightness based on only illuminating light, for obtaining the maximum value (the brightness of b1 in FIG. 8) and the minimum value (the brightness of b2 in FIG. 8) in the range of the screen brightness obtained from the inequality (4), respectively.

Therefore, the illuminating brightness based on only the illuminating light for obtaining a screen brightness suitable for satisfying the inequality (4) is a brightness within the range between b1' and b2'. As shown in FIG. 9, on the basis of calculation, when the environmental illumination exceeds about 800 lx, the screen brightness of b2' is 0 nit or less. At the environmental illumination over about 800 lx, the illuminating brightness based on only illuminating light does not become 0 nit or less. Therefore, the range of the illuminating brightness based on only the illuminating light for obtaining a screen brightness suitable for satisfying the inequality (4) is the brightness range from 0 nit to b1'.

It is therefore desirable that, at an environmental illumination which is, at lowest, higher than indoor illumination (about 1000 lx), the illumination brightness controller 26 controls the brightness of the illuminating light from the light radiating unit 10 in a manner that the illuminating brightness based on only the illuminating light is set within the range shown in FIG. 9. In this way, a more suitable screen brightness (the screen brightness within the range A shown in FIG. 8, and more preferably the range B) can be obtained in environments having, at lowest, a higher illumination than indoor illumination.

In this case, at an environmental illumination of not more than indoor illumination, the brightness of the illuminating light may be kept constant. Even in this case, if the illuminating brightness of the illuminating light is set in a manner that the illuminating brightness based on only the illuminating light becomes a brightness within the range shown in FIG. 9, a screen brightness suitable for the environmental illumination can be obtained at the environmental illumination of not more than indoor illumination, as well.

It is desirable that, within the range of environmental illuminations of from less than 50 lx to more than about 30000 lx, the illumination brightness controller 26 controls the brightness of the illuminating light from the light radiating unit 10 in a manner that the illuminating brightness based on only the illuminating light is set within the range shown in FIG. 9. In this way, in environments with a wide illumination range having illuminations from less than 50 lx to more than about 30000 lx a screen brightness more suitable for the environmental illumination thereof can be obtained.

It is desirable that, within the illumination range in which the environmental illumination is lower than indoor illumination, the illumination brightness controller 26 controls the light radiating unit 10 in a manner that the brightness of the illuminating light is continuously lowered as the environmental illumination becomes low. In this way, in the environment of the illumination range lower than indoor temperature, that is, in the environment that display can be sufficiently recognized even at a low screen brightness, it is possible to obtain a screen brightness suitable for the environmental illumination, and make consumed electric power of the light radiating unit 10 smaller.

It is desirable that within the illumination range in which the environmental illumination is higher than indoor illumination the illumination brightness controller 26 controls the light radiating unit 10 in a manner that, in the case in which the environmental illumination is not more than a given illumination which is higher than the indoor illumination, the brightness of the illuminating light is continuously raised as the environmental illumination rises and, in the case in which the environmental illumination exceeds the given illumination, the brightness of the illuminating light is continuously lowered as the environmental illumination rises.

The given environmental illumination which is higher than indoor illumination in the case in which a screen brightness suitable for satisfying the inequality (4) can be obtained is about 30000 lx. In this case, when the environmental illumination exceeds about 30000 lx, the brightness of the illuminating light can be desirably controlled in a manner that the screen brightness based on only the illuminating light is continuously lowered as the environmental illumination further rises.

In this way, within the illumination range in which the environmental illumination is higher than indoor illumination, the brightness of the illuminating light is continuously raised as the environmental illumination rises. Thus, a screen brightness suitable for the environmental illumination is obtained. In the case that the environmental illumination exceeds the given illumination which is higher than indoor illumination and a screen brightness suitable for the environmental illumination can be obtained by only the reflected light of ambient light, the brightness of the illuminating light is continuously lowered as the environmental illumination further rises. Thus, a screen brightness suitable for the environmental illumination can be obtained. Additionally, consumed electric power can be reduced.

Within the range in which the environmental illumination is lower than indoor illumination, the illumination brightness controller 26 controls the brightness of the light radiating unit 10 in a manner that the brightness of the illuminating light is continuously lowered as the environmental illumination drops, as described above. Within the illumination range in which the environmental illumination is higher than indoor illumination, the illumination brightness controller 26 controls the light radiating unit 10 in a manner that, in the case in which the environmental illumination is not more than the given illumination which is higher than indoor illumination, the brightness of the illuminating light is continuously raised as the environmental illumination rises, as above. Furthermore, it is more preferable that the illumination brightness controller 26 controls the brightness of the light radiating unit 10 in a manner that, in the case in which the environmental illumination exceeds the given illumination, the brightness of the illuminating light is continuously lowered as the environmental illumination further rises.

In this way, within the illumination range in which the environmental illumination is lower than indoor illumination, that is, in the environment that display can be sufficiently recognized even at a low screen brightness, a low screen brightness more suitable for the environmental illumination thereof is obtained. Additionally, consumed electric power of the light radiating unit 10 can be further reduced.

Within the illumination range in which the environmental illumination is higher than indoor illumination, the brightness of the illuminating light is continuously raised as the environmental illumination rises. Thus, a screen brightness suitable for the environmental illumination is obtained.

Furthermore, in the case in which the environmental illumination exceeds the given illumination which is higher than indoor illumination and a screen brightness suitable for the environmental illumination can be obtained by only the reflected light of ambient light, the brightness of the illuminating light is continuously lowered as the environmental illumination further rises. Thus, a screen brightness suitable for the environmental illumination can be obtained. Besides, consumed electric power can be further reduced.

That is, in this display device, it is most preferable that the range of the environmental illumination to which illuminating light is emitted from the light radiating unit 10 is set to the range from 0 lx to more than about 30000 lx; the reflectivity of the display device is set in a manner that the screen brightness at a high environmental illumination in which display is performed by only the reflected light of ambient light, with the stop of emission of the illuminating light from the light radiating unit 10, satisfies the inequality (3), and more preferably inequality (4); and the brightness of the light radiating unit 10 is controlled in a manner that, within the illumination range in which the environmental illumination is lower than indoor illumination, the brightness of the illuminating light is continuously lowered as the environmental illumination drops; and within the illumination range in which the environmental illumination is higher than the indoor illumination, in the case in which the environmental illumination is lower than a given illumination which is higher than the indoor illumination, the brightness of the illuminating light is continuously raised as the environmental illumination rises, and in the case in which the environmental illumination exceeds the given illumination, the brightness of the illuminating light is continuously lowered as the environmental illumination further rises.

In this way, in the environment of the wide illumination range from 0 lx to a high environmental illumination in which display is performed by only the reflected light of ambient light a suitable screen brightness can be obtained. In addition, consumed electric power can be reduced.

In the above-mentioned embodiment, the illumination brightness controller 26 is composed of the illumination detector 27 for measuring environmental illuminations, and a means for controlling the brightness of the illuminating light which the light radiating unit 10 emits (the light source brightness adjusting circuit 28 and the light source turning-on circuit 29), based on the environmental illumination measured with the illumination detector 27. Therefore, it is possible to control the brightness of the illuminating light in accordance with the illumination of an actual use environment and obtain a screen brightness suitable for the environmental illumination.

In the above-mentioned embodiment, the light radiating unit 10 arranged at the back of the liquid crystal display element 1 has a structure composed of the light source 16, and the photoconductor 11 having the emitting faces (the respective step-level-difference faces 12b of the stepwise face 12 of the photoconductor 11) for guiding illuminating light from the light source 16 and emitting the light toward the liquid crystal display element 1, and reflective faces 14 (the surface of the reflective film 13 formed on the respective step-level-difference face 12 of the stepwise face 12 of the photoconductor 11), different from the emitting faces, for reflecting ambient light projected from the front of the liquid crystal display element 1 toward the liquid crystal display element 1. Therefore, it is possible to select the emitting rate of the illuminating light from the emitting faces (the step-level-difference faces 12b) and the reflectivity of the ambient light on the reflective faces 14, independently on each other.

Therefore, the emitting rate of the illuminating light from the emitting faces (the step-level-difference faces 12b) is made high to raise the available efficiency of the illuminating light from the light source 16, and thus the illuminating brightness of the light source 16 is lowered accordingly so as to further reduce consumed electric power. Additionally, the reflectivity of the ambient light on the reflective faces 14 can be set in a manner that the reflectivity of the display device becomes a desired value.

The light radiating unit 10 is a unit wherein the optical member 20 the back face of which has the incident portions 21 is arranged at the front side of the photoconductor 11 the front face of which is made up to the stepwise face 12. The step-level-difference faces 12b of the photoconductor 11 and the incident portions 21 of the optical member 20 are disposed at pitches different from each other. For this reason, good light without moire fringes can be emitted by making non-cyclical the relative gap of the pitches of the step-level-difference faces 12b of the photoconductor 11 and the incident portions 21 of the optical member 20, or by making the cycle large.

In the above-mentioned, the light diffusing face 15 is formed at the back face of the photoconductor 11 constituting the light radiating unit 10 in order to average the brightness distribution in the width direction of the photoconductor of the illuminating light projected from the incident end face 11a of this photoconductor 11. Therefore, it is possible to make substantially uniform the brightness distribution, of the illuminating light which is taken in from the incident end face 11a of this photoconductor 11 and emitted from the respective step-level-difference faces 12b of the photoconductor front face in the width direction of the photoconductor 11.

In this display device of the above-mentioned embodiment, the light diffusing film 23 is disposed between the light radiating unit 10 and the liquid crystal display element 1. As a result, illuminating light from the light radiating unit 10 and reflected light of ambient light are diffused by the light diffusing film 23 so that the light is projected into the liquid crystal display element 1 from its back face as light having a substantially uniform brightness distribution. Thus, the screen brightness can be made uniform over the whole of the screen. Moreover, the range of emission angles of the light emitted ahead of the liquid crystal display element 1 is made wide so that a wide visual field angle can be obtained.

In the above-mentioned embodiment, the reflecting polarizer 24 is disposed between the light radiating unit 10 and the liquid crystal display element 1, the plate 24 having the reflection axis 24s and the transmission axis 24p crossing each other at right angles and having a property that the incident light of the polarized component along the reflection axis 24s is reflected and the incident light of polarized component along the transmission axis 24p is transmitted.

For this reason, the light of the polarized component along the transmission axis 24p of the reflecting polarizer 24, among illuminating light from the light radiating unit 10, is transmitted through the reflecting polarizer 24 and projected into the liquid crystal display element 1. In addition, the light of the polarized component perpendicular to the transmission axis 24p is reflected, without being absorbed, to be reused. Thus, almost all of the light from the light radiating unit 10 can be projected into the display element without waste. Accordingly, the available efficiency of the illuminating light from the light radiating unit 10 can be made high so that the luminous brightness of the light source 16 can be lowered accordingly. Thus, consumed electric power can be further reduced.

In the above-mentioned embodiment, the light diffusing film 23 is disposed on the front face of the light radiating unit 10 (the front face of the optical member 20) and the reflecting polarizer 24 is disposed on its front face. However, the light diffusing film 23 and the reflecting polarizer 24 may be laminated in the order reverse to that of the above-mentioned embodiment.

The light diffusing film 23 is not limited to the coating film of a transparent adhesive agent in which light diffusing particles are dispersed. There may be used a light diffusing plate, or a scattering plate having a selective scattering property in which a scattering property is exhibited for the light projected at an incident angle, within the angle range of a given angle or more inclined to the face perpendicular to the plate face and along a certain direction, and scattering property is seldom exhibited for the light projected at an incident angle within the range of angles smaller than the given angle. However, the light diffusing film 23 is not necessarily needed. The reflecting polarizer 24 may also be omitted.

The refractive faces 21b of the optical member 20 constituting the light emitting means 10 may be straight faces having a constant inclination angle as shown in FIGS. 1 and 3. If the refractive faces 21b are made up to light-concentrating refractive faces in a curved form, the light which is taken in from the incident faces 21a and then reflected or refracted in the front direction by the refractive face 21b is concentrated in a given direction by light-concentrating effect of the refractive faces 21b which are the light-concentrating refractive faces in a curved form. For this reason, it is possible to emit illuminating light and reflected light having a brightness distribution with a more intensive directivity.

In the above-mentioned embodiment, the light diffusing face 15 is formed on the back face of the photoconductor 11 constituting the light radiating unit 10, the face 15 being for averaging the brightness distribution, in the width direction of the photoconductor, of the illuminating light projected from the incident end faces 11a of the photoconductor 11. The back face of the photoconductor 11 may be a flat face. When almost all of the light advancing the back face of the photoconductor 11, among the illuminating light projected from the incident end face 11a of the photoconductor 11, can be totally reflected on the interface between the back face of the photoconductor 11 and the open air, the reflector 19 arranged at the back of the photoconductor 11 may be omitted in the above-mentioned embodiment.

The photoconductor 11 may be a photoconductor wherein its end faces are made up to incident end faces for taking in illuminating light from light source 16, respectively. For example, in the case that each of two opposite end faces of the photoconductor 11 is made up to an incident end face, the front face of this photoconductor 11 may be made up to a stepwise face which becomes lower stepwise from both the incident end faces toward the middle portion of the photoconductor 11 and the light source 16 may be arranged opposed to each of both the incident faces.

The light source 16 is not limited to one using the luminescent lamp 17, and may be, for example, an LED array wherein LEDs (light emitting diodes) are arrayed, an EL (electroluminescence) panel, or the like.

The light radiating unit 10 used in the above-mentioned has a structure having the light source 16, and the photoconductor 11 having the emitting faces (the respective step-level-difference faces 12b of the stepwise face 12) for guiding illuminating light from the light source 16 and emitting the light toward the liquid crystal display element 1, and reflective faces 14, different from the emitting faces, for reflecting ambient light projected from the front of the liquid crystal display element 1 toward the liquid crystal display element 1. However, if the light radiating unit 10 is composed of a means for emitting illuminating light onto the liquid crystal display element 1, and a means for reflecting the ambient light projected from the front of the liquid crystal display element 1 and emitting the reflected light onto the liquid crystal display element 1, the light radiating unit 10 may have any structure.

The above-mentioned display device is a device using the TN type liquid crystal display element 1 in an active matrix type. The liquid crystal display element 1 may be however any one, for example, a passive matrix type, or a segment type. The element 1, which is not limited to the TN type, may be an STN (super twisted nematic), ECB (double refraction effect), or dynamic scattering effect type liquid crystal display element, a liquid crystal display element using a ferroelectrical liquid crystal, or the like.

The display device of the above-mentioned embodiment is a device using the liquid crystal display element 1 as a display element. However, this invention can be widely applied to a display device using a non light-emitting type display element, in which other electro-optical display element, a light transmissible image printed film, or the like is used as the display element.

2nd Embodiment

Figure 10:
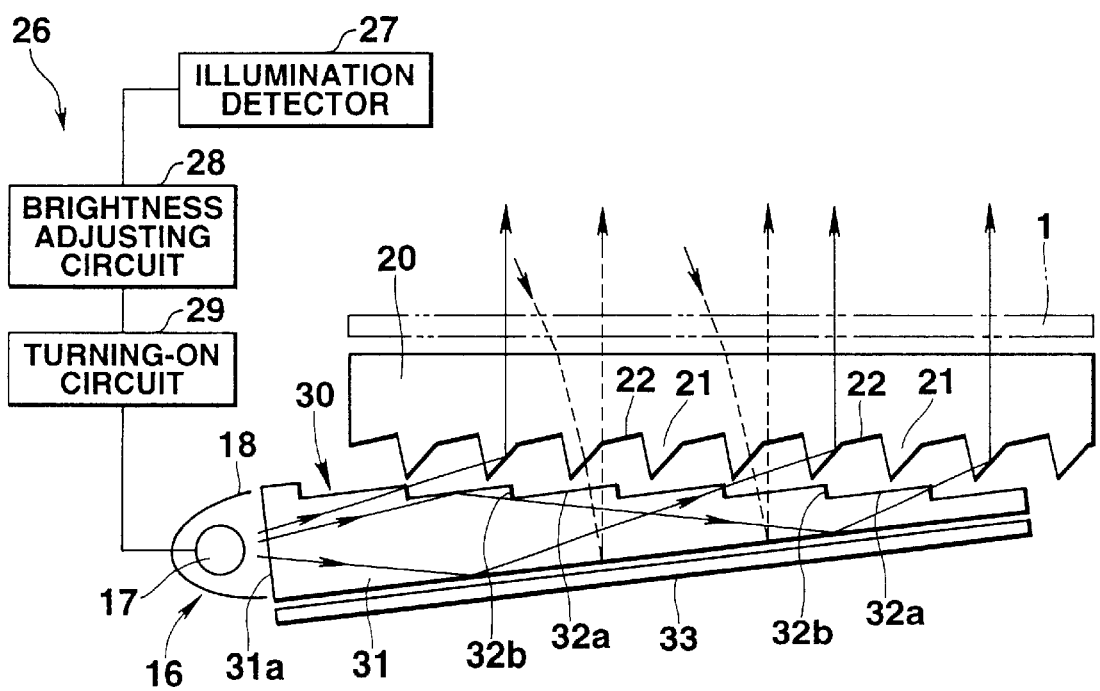
FIG. 10 is an enlarged cross section view illustrating a display device using a lighting panel according to a second embodiment of this invention.

FIG. 10 is an enlarged partial view of a display device of the second embodiment using a light radiating unit different from the first embodiment.

This light radiating unit 30 of the second embodiment has a photoconductor 31, a light source 16 arranged at the side of this photoconductor 31, a reflector (a reflecting means) 33 disposed to face the back face of the photoconductor 31, and an optical member 20 arranged at the front face side of the photoconductor 31. Other basic structures of the display device are the same as in the first embodiment, and its effects and advantages are the same. Thus, the same reference numbers are attached to the figure so that repeated explanation is omitted.

The photoconductor 31 is formed by transparent plate made of an acrylic resin or the like. Its one end is made up to the incident end face 31a for taking in light from the light source 16. The front face of this photoconductor 31 is made up to a stepwise face having a very small pitch and composed of step faces 32a parallel to each other which are formed to become lower stepwise in the direction from the side of the incident end face 31a to the other end face side, and step-level-difference faces 32b for connecting these step faces 32a. The back face thereof is made up to a flat face.

The step faces 32a are long sideways flat faces which are substantially parallel to the back face of the photoconductor 31 and are along the width direction of the photoconductor 31 (the length direction of the incident face 32a). The respective step faces 32a are made up to incident/emitting faces of ambient light.

The step-level-difference faces 32b are rising faces which are substantially parallel to the incident end face 31a and have a very small height. These step-level-difference faces 32b are made up to emitting faces of respective illuminating light rays.

In this photoconductor 31, the illuminating light from the light source 16 arranged at the side thereof is taken in from the incident end face 31a and then emitted from the step-level-difference faces 32b, and the ambient light projected from the front is taken in from the step faces 32a, emitted toward the back face, and then reflected on the reflecting means 33. The reflected light is projected into the photoconductor 31 from its back face and emitted from the step faces 32a.

The reflector 33 of the back side reflecting means arranged to face the back face of the photoconductor 31 has a mirror face with a high reflectivity, and this reflector 33 is arranged so that its surface, that is, the reflective face approaches the back face of the photoconductor 31.

On the other hand, the optical member 20 arranged at the front side of the photoconductor 31 has a characteristic for transmitting the ambient light projected from the front of the optical member and the reflected light of the ambient light which is reflected on the reflector 33 and emitted from the step faces 32a of the photoconductor 31, and for emitting the illuminating light emitted from the step-level-difference faces 32b of the photoconductor 31 ahead in a given direction.

This optical member 20 has a front face which is a flat face, and a back face which faces the front face of the photoconductor 31, and is a transparent plate made of an acrylic resin or the like and having substantially the same width as that of the photoconductor 31. The following is integrated with its back face: incident portions 21 for taking in the light emitted from the respective step-level-difference faces 32*b* of the photoconductor 31.

The respective incident portions 21 are made up to long sideways projections having a length over the whole length of the optical member 20. The optical member 20 is arranged in a manner that the length direction of the incident portions 21 at the back face side of the member 20 is substantially parallel to the length direction of the step-level-difference faces 32*b* of the photoconductor 31 and further the top faces of the incident portions 32 approach or contact the respective step faces 32*a* of the photoconductor 31.

The respective incident portions 21 are arranged to leave spaces between the incident portions 21 at a constant pitch. The areas between the adjacent incident portions 21, among the back face of the optical member 20, are made up to incident/emitting faces 22 opposite to the step faces 32*a* of the photoconductor 31.

This incident/emitting face 22 is a face having an inclination substantially parallel to the step face 32*a* of the photoconductor 31 or an inclination similar thereto, and is a face for transmitting the ambient light which is projected into the optical member 20 from its front and the reflected light of the ambient light which is reflected on the reflector 19 and then emitted from the step faces 32*a* of the photoconductor 31.

The incident portions 21 are disposed at a pitch which is smaller than the pitch of the respective step-level-difference faces 32*b* of the photoconductor 31. Therefore, each of the step-level-difference faces 32*b* of the photoconductor 31 is necessarily opposite to at least one incident portion 21 of the optical member 20.

As shown in FIG. 10, this light radiating unit 30 has the light source 16, and the illumination brightness controller 26 for controlling the brightness of the illuminating light emitted from this light source 16.

This illumination brightness controller 26 is composed of an illumination detector 27 for measuring the illumination of use environments, and a means for controlling the brightness of the illuminating light emitted from a lighting body 17 of the light source 16, on the basis of the environmental illumination measured with this illumination detector 27. The means for controlling the brightness of the illuminating light is composed of a brightness adjusting circuit 28 and a light source turning-on circuit 29.

In order to measure the same environmental illumination as the illumination of the ambient light projected into the plane light-source device from its front, the illumination detector 27 is arranged so that its light receiving face is substantially parallel to the front face of the light radiating unit 30 (the front face of the optical member 20).

The brightness adjusting circuit 28 is a member for adjusting the brightness of the illuminating light emitted from the light source 16, on the basis of the environmental illumination measured with the illumination detector 27, so that the brightness of the emitted light which is emitted ahead of the plane light-source device is set up into the predetermined brightness range according to the environmental illumination. The light source turning-on circuit 29 drives the lighting body 17 of the light source 16 to emit illuminating light having a brightness in the width direction of the photoconductor 11, to the brightness value from the brightness adjusting circuit 28.

In this light radiating unit 30, the reflectivity of ambient light on the reflector 33 and the condition for controlling the brightness of the illuminating light by the illumination brightness controller 26 are set, so that the brightness of the light emitted ahead of the plane light-source device is set within the brightness range predetermined in accordance with the environmental illumination in the outside.

The light radiating unit 30 is a unit for guiding the illuminating light from the light source 16 through the light-guiding plate 31 to be emitted from the step-level-difference faces 32*b* at the front of this light-guiding plate 31, and for reflecting the ambient light projected from the front on the reflector 33 to be emitted ahead. When emitted light having a sufficient brightness cannot be obtained by only the reflected light of the ambient light projected from the front, the light source 16 is turned on.

That is, when ambient light having a sufficient brightness is obtained in this light radiating unit 30, the light source is not turned on and only the reflected light of the ambient light is emitted. When the brightness of ambient light is insufficient, the light source 16 is turned on and both of the reflected light of the ambient light and the illuminating light from the light source 16 are emitted. Thus, the shortage of the brightness of the reflected light of the ambient light is supplemented by the above-mentioned illuminating light. When ambient light cannot be obtained, light is emitted from the light source 16.

First, the emission path of the illuminating light from the light source 16 will be described. The illuminating light from the light source 16 is, as shown by solid arrows drawn in FIG. 10, taken in the photoconductor 31 from the incident end face 31*a*, and then is guided inside this photoconductor 31 in its length direction.

The light which directly advances toward any one of the step-level-difference faces 32*b* at the front face of the photoconductor, among the illuminating light guided inside the photoconductor 31 in its longitudinal direction, is emitted from the step-level-difference faces 32*b* toward the front face of the photoconductor 31. The light other than the light which directly advances toward the step-level-difference faces 32*b*, that is, the light which advances toward the step faces 32*a* at the front face of the photoconductor or the light which advances toward the back face of the photoconductor 31, is conducted inside the photoconductor 31 in its length direction by total reflection on the interface between the step faces 32*a* and the open air (the air layer between the photoconductor 31 and the optical member 20) or total reflection on the interface between the back face of the photoconductor and the open air (the air layer between the photoconductor 31 and the reflector 33), to be projected into any one of the step-level-difference faces 32*b* and emitted from the step-level-difference face 32*b*.

The light which advances inside the photoconductor 31 toward its back face includes the light projected onto the interface between the back face of the photoconductor and the open air at a (substantially perpendicular) incident angle which is smaller than the critical total reflection angle. This light is transmitted through the above-mentioned interface and then leaks to the back face of the photoconductor 31. The leaked light is reflected on the reflector 33 arranged closely to the back face of the photoconductor 31 and then again projected into the photoconductor from its back face.

Concerning this re-incident light, its direction is changed by total reflection on the interface between the step faces 32*a* at the front face of the photoconductor and the open air and total reflection on the interface between the back face of the photoconductor and the open air. The light is emitted from any one of the step-level-difference faces 32*b*.

The light guided inside the photoconductor 31 includes the light incident onto the interface between the step faces 32a at the front face of the photoconductor and the open air at an incident angle which is smaller than the critical total reflection angle. This light is transmitted through this interface and then emitted from the step faces 32a ahead of the photoconductor 31.

For this reason, almost all of the illuminating light taken in the photoconductor 31 from its incident end face 31a is emitted ahead of the photoconductor 31 without waste.

The illuminating light emitted ahead of the photoconductor 31 is incident into the incident portions 21 at the back face of the optical member 20 arranged at the front face side of this photoconductor 31 from the incident faces 21a, each of which is a side face of the incident portion.

At this time, each of the step-level-difference faces 32b of the photoconductor 31 is necessarily opposite to at least one incident portion 21 of the optical member 20. Therefore, almost all of the light emitted from the step-level-difference faces 32b of the photoconductor 31 is projected into any one of the incident portions 21 of the optical member 20 without waste.

The illuminating light emitted ahead of the photoconductor 31 includes the light emitted from the step faces 32a, as described above. This light is also projected into any one of the incident portions 21 of the optical member 20 without waste.

The emitted light from the step-level-difference faces 32b of the photoconductor 31 includes the light emitted toward the adjacent step faces 32a, as shown in FIG. 10. This light is reflected on the interface between the adjacent step faces 32a and the open air and then incident into the incident portions 21 of the optical member 20.

The light which is incident into the incident portions 21 of the optical member 20 is taken in the incident portions 21 from the incident faces 21a thereof, and then is totally reflected on the interface between the opposite refractive faces 21b and the open air, so that its direction is changed toward the front face of the optical member 20. The light is transmitted through this optical member 20 and emitted from its front face.

For this reason, the illuminating light which is emitted from the front face of the optical member 20 ahead is light which is incident into the incident portions 21 from their incident faces 21a, refracted on the opposite refractive faces 21b (the interface to the open air), and concentrated in a given direction, and which has a brightness distribution in which the brightness in the given direction is high.

Next, the emission path of the ambient light projected from the front will be described. The ambient light incident from the front is, as shown by broken lines drawn in FIG. 10, is incident into the optical member 20 from its front face, transmitted through the optical member 20, and emitted from the incident portions 21 at the back thereof and the incident/emitting faces therebetween.

Almost all of the ambient light emitted toward the back side of the optical member 20 is taken in the photoconductor 31 from the step faces 32a of the photoconductor 31, transmitted inside this photoconductor 31, and emitted toward its back face.

The light emitted toward the back face of the photoconductor 31 is reflected on the reflector 33 which is arranged to face the back face of the photoconductor 31. The reflected light is taken in the photoconductor 31 from its back face, transmitted inside this photoconductor 31, and emitted from the step faces 32a ahead. The emitted light is incident into the optical member 20 from the incident portions 21 at the back thereof and the incident/emitting faces 22 therebetween.

As described above, in this case, concerning the incident portions 21, its incident face 21a at one side thereof is a face substantially parallel to the step-level-difference face 32b of the photoconductor 31 or a face having an inclination similar thereto, the refractive or reflecting face 21b at the opposite side is an inclined face having an inclination angle in which the angle to the normal of the front face of the optical member 20 is larger than the angle between the incident face 21a and the normal. Therefore, almost all of the reflected light emitted from the step-level-difference faces 32a of the photoconductor 31 is taken in the optical member 20 from the refractive faces 21b, having a large inclination angle, of the incident portions 21, and the incident/emitting faces 22 between the incident portions 21.

The light advancing toward the front face of the optical member 20, among the reflected light taken in the optical member 20 from the refractive faces 21b and the incident/emitting faces 22 of the incident portions 21, is transmitted through the optical member 20, and then emitted from its front face. Among the light taken in from the refractive faces 21b of the incident portions 21, the light advancing toward the opposite incident faces 21a is totally reflected on the interface between the incident faces 21 and the open air, so that its advancing direction is changed to the direction similar to the direction of the light advancing directly from the refractive faces 21b and the incident/emitting faces 22 toward the optical member 20. The light is emitted from the front face of the optical member 20.

For this reason, this light radiating unit 30 causes the ambient light projected from the front thereof to be emitted ahead without substantial waste. Moreover, the reflected light of the ambient light emitted from the front face of this optical member 30 (the front face of the optical member 20) toward the front is light in which the ambient light projected at various incident angles are concentrated to exhibit a high brightness. Therefore, the reflected light of the ambient light is also light having a brightness distribution in which the brightness of the light emitted in a given direction (for example, in the front direction) is high.

Besides, in this light radiating unit 30 the optical member 20 has the above-mentioned structure. Thus, it is possible to refract the light which is emitted from the step-level-difference faces 32b of the photoconductor 31 and projected into the incident portions 21 of the optical member 20 from the incident faces 21a, on the refractive faces 21b, concentrate the light in a given direction, and emit illuminating light having a brightness distribution in which the brightness in a given direction (for example, in the front direction is high) from the front face of this optical member 20 is high. In addition, it is possible to emit the reflected light of the ambient light which is reflected on the reflector 33 and emitted from the step faces 32a of the photoconductor 31, as light having a brightness distribution in which the brightness in a given direction (for example, in the front direction) is high, ahead of the optical member 20.

In the light radiating unit 30, the light source 16 has the illumination brightness controller 26 for controlling the brightness of the illuminating light emitted from this light source 16, to set the reflectivity of the ambient light on the reflector 33 and the conditions for controlling the brightness of the illuminating light by the illumination brightness controller 26 so that the brightness of the light emitted ahead of the light radiating unit 30 is set within the brightness range predetermined in accordance with the environmental illumination of the outside. Therefore, in environments with a wide illumination range having from a low illumination to high illumination, light having a brightness suitable for the environment illumination can be emitted.

That is, the suitable brightness of the emitted light which the light radiating unit 30 emits varies dependently on the environmental illumination of the outside. Thus, even in the case that the brightness of the emitted light is the same, the emitted light is too dazzling or dark in some environmental illumination.

Therefore, in this embodiment, the reflectivity on the reflector 33 is set in a considerably low value so that the emitted light having a suitable brightness, which is not very dazzling, can be obtained even in the environment having a high illumination over 100000 lx, for example, under the direct rays of the sun in summer. Additionally, the brightness of the illuminating light emitted from the light source 16 is controlled in accordance with environmental illuminations by the illumination brightness controller 26 so that the emitted brightness of both of the reflected light of the ambient light reflected on the reflector 33 and the illuminating light from the light source 16 (the emitted brightness of only the illuminating light when the environmental illumination is about 0 lx) is made up to a brightness suitable for the environmental illumination.

According to the light radiating unit 30, therefore, the light having a brightness suitable for the environmental illumination can be obtained in accordance with the environmental illumination when in the environment wherein ambient light having a sufficient brightness can be obtained only the reflected light of the ambient light is emitted without turning on the light source 16, when in the environment wherein the brightness of ambient light is insufficient the light source 16 is turned on and thus both of the reflected light of the ambient light and the illuminating light from the light source 16 are emitted so that the shortage of the brightness of the reflected light of the ambient light is supplemented by the above-mentioned illumination, and when in the environment wherein no ambient light can be obtained the illuminating light is emitted from the light source.

Moreover, in the environment wherein ambient light having a sufficient brightness can be obtained, even if the light source 16 is not turned on, light having a brightness suitable for the environmental illumination can be emitted by only the reflected light of the ambient light in the light radiating unit 30. When in the environment wherein the brightness of ambient light is insufficient the light source 16 is turned on and thus both of the reflected light of the ambient light and the illuminating light from the light source 16 are emitted so that the shortage of the brightness of the reflected light of the ambient light is supplemented by the above-mentioned illumination, the brightness of the illuminating light emitted from the light source 16 may be controlled in a manner that the emitted brightness based on both of the reflected light of the ambient light and the above-mentioned illuminating light is made up to a brightness suitable for the environmental illumination. Thus, consumed electric power of the light source 16 may be a little.

When the light radiating unit is used in a 2-way display device, the reflectivity of ambient light on the reflector 33 and the conditions for controlling the brightness of the illuminating light by the illumination brightness controller 26 may be set in a manner that the screen brightness is set into the range predetermined in accordance with the environmental illumination of the outside.

In the second embodiment, the reflector 33 is arranged at the back side of the photoconductor 31 and closely to the back face thereof. This reflector 33 may be however stuck onto the back face of the photoconductor 31. The reflector 33 for ambient light disposed at the back face side of the photoconductor 31 is not limited to the above-mentioned reflector 33, and may be formed, for example, by disposing a reflective film made of aluminum, silver, or the like on the back face of the photoconductor 31 by vapor deposition or the like.

3rd Embodiment

The third embodiment is different from the display device of the first embodiment in only the structure of a used liquid crystal display element. Other basic structure of the display device is the same as that of the first embodiment. Its effect and advantages are the same. Thus, the same reference numbers are attached to the figure, so that repeated explanation is omitted.

Figure 11:
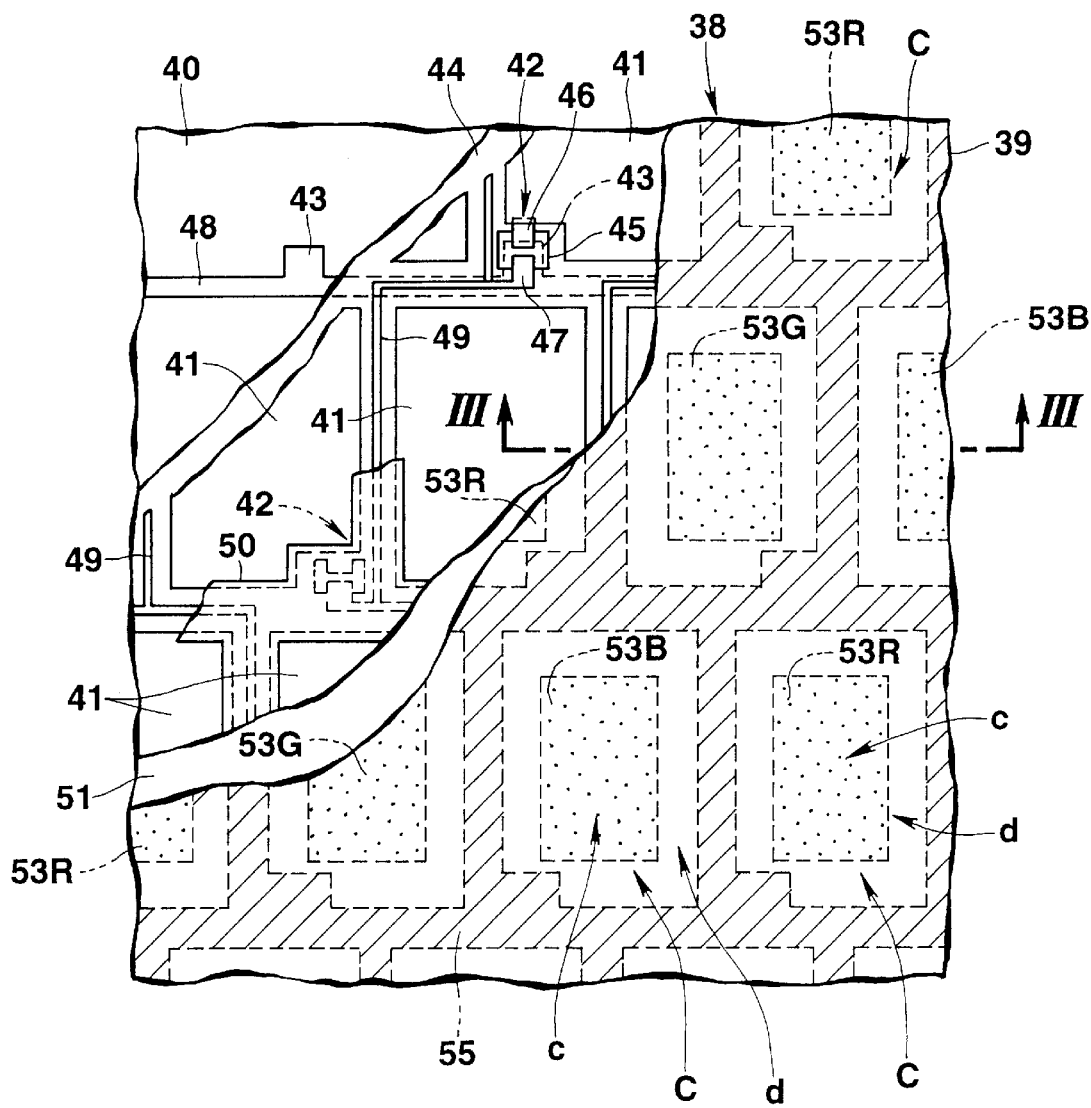
FIG. 11 is a plan view illustrating a liquid crystal element used in a display device according to a third embodiment of this invention.
Figure 12:
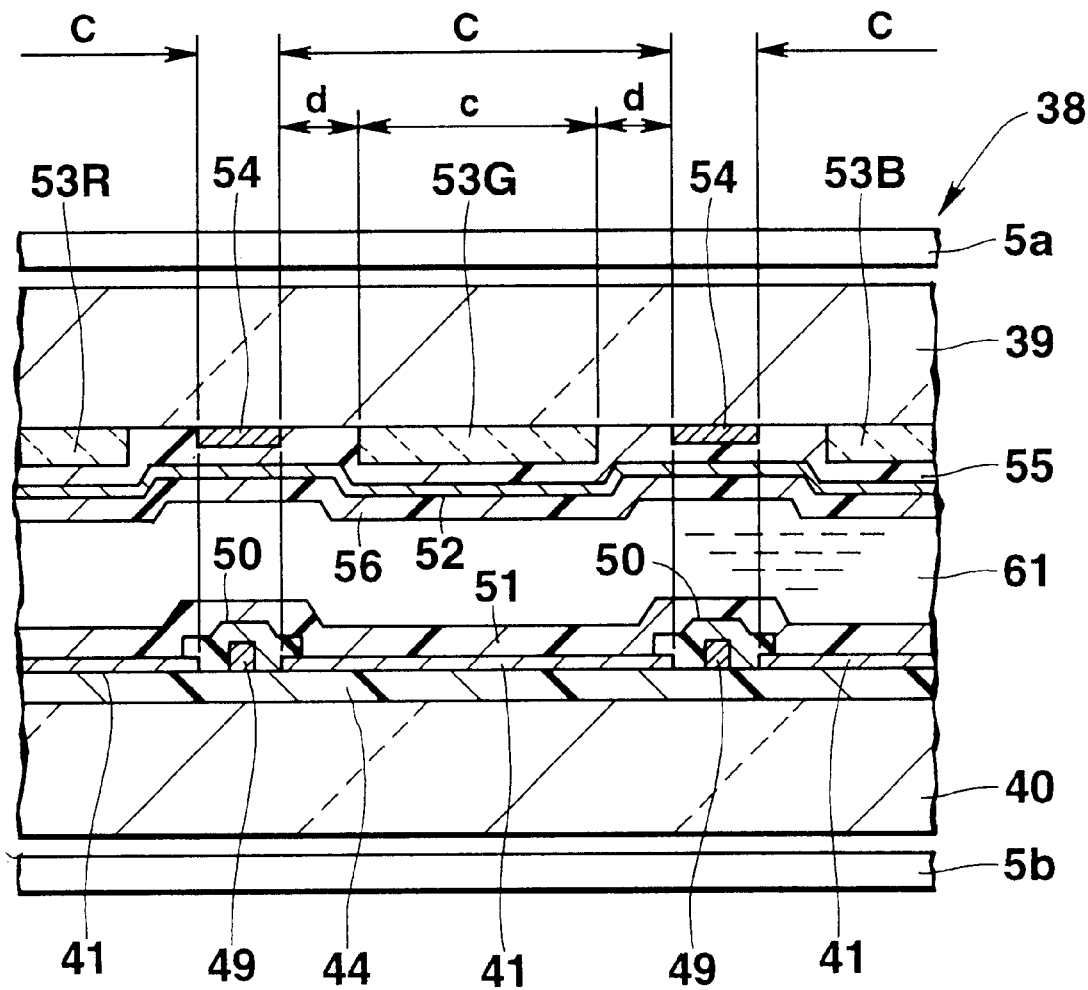
FIG. 12 is a cross section view illustrating the liquid crystal element used in the display device according to the third embodiment of this invention.

FIG. 11 is a front view of a part of a liquid crystal display element 38 used in the display device of the third embodiment. FIG. 12 is an enlarged cross section view of the FIG. 11 along the line III—III.

The liquid crystal display element 38 used in the display device of the third embodiment is an active matrix type using a TFT (thin film transistor) as an active element. Among a pair of transparent substrates 39 and 40 at the front and back sides opposing through a liquid crystal layer 61, the substrate 40 at the back side has on its inner face transparent pixel electrodes 41 arranged in a matrix form and TFTs 42 corresponding to the respective pixel electrodes 41.

The TFT 42 is composed of a gate electrode 43 formed on the back side substrate 40, a gate insulating film 44 for covering the gate electrode 43, an i-type semiconductor film 45 formed on this gate insulating film 44 opposed to the gate electrode 43, and a source electrode 46 and a drain electrode 47 formed on both side portions of this i-type semiconductor film 45 through a (non-illustrated) n-type semiconductor film.

Gate lines 48 for supplying gate signals for respective lines of the TFTs 42 are wired, along one side of respective lines of the pixel electrodes, on the back side substrate 40. The gate electrodes 43 of the respective lines of the TFTs 42 are integrated with the gate lines 48 corresponding to the respective lines.

The gate insulating film (transparent film) 44 of the TFTs 42 are formed over the substantial whole surface of the back side substrate 40. The gate lines 48 are covered, except their terminal portions, with the gate insulating film 44.

Data lines 49 for supplying data signals for respective rows of the respective TFTs 42 are wired, along one side of respective rows of the pixel electrodes, on the gate insulating film 44. The drain electrodes 47 of the respective rows of the TFTs 42 are connected with the data lines 49 corresponding to the respective rows.

The pixel electrodes 41 are formed on the gate insulating film 44, and each of these pixel electrodes 41 is, in the end portion of its one side edge, connected with the source electrode 46 of the TFT 42 corresponding to the pixel electrode 41.

A transparent overcoat insulating film 50 for covering the TFTs 42, the data lines 49, and the peripheral portions of the respective pixel electrodes 41 is disposed on the inner face of the back side substrate 40. An alignment layer 51 is formed thereon.

On the other hand, the front side substrate 39 has on its inner face a transparent opposite electrode 52 in a single film form, which is opposite to the pixel electrodes 41 of the back side substrate 40 and whose portions opposite to these pixel electrodes 41 make up to pixel areas C; color filters 53R, 53G and 53B in colors corresponding to the respective pixel areas C, for example, red, green and blue colors; a light-shielding film (black mask) 54 corresponding to areas between the respective pixel areas; and an alignment film 56.

In FIG. 12, dot patterns are applied to the color filter portions, and hatching is applied to the light-shielding film portions to make an easy distinction between the color filters 53R, 53G and 53B and the light-shielding film 54.

In this embodiment, the color filters 53R, 53G and 53B and the light-shielding film 54 are disposed on the front side substrate 39, and the upper face thereof is covered with a transparent protective insulating film 55. The opposite electrode 52 is formed on the transparent protective insulating film 55, and the alignment film 56 is disposed thereon.

Each of the color filters 53R, 53G and 53B is made up to a shape having an area smaller than the area of the pixel area C wherein the pixel electrode 41 and the opposite electrode 52 are opposite to each other. Each of these color filters 53R, 53G and 53B is arranged corresponding to the inner area except the peripheral portion of the pixel area C.

The front side substrate 39 and the back side substrate 40 are jointed through the frame-form seal member 4 (see FIG. 1) in the respective peripheral portions thereof. Liquid crystal is charged into the spaces surrounded by the seal member 4 between these substrates 39 and 40, so that a liquid crystal layer 61 is formed.

This liquid crystal display element 38 is a TN (twisted nematic) type one, and liquid crystal molecules of the liquid crystal layer 61 are twist-oriented at a given twist angle (for example, about 90 degrees) between both the substrates 39 and 40. The polarizers 5*a* and 5*b* are arranged on the respective outer faces of both the substrates 39 and 40 so that their optical axes (a transmission axis or an absorption axis) are directed in a given direction.

In the liquid crystal display element 38, the area of the color filter 53R, 53G or 53B arranged in the liquid crystal display element 38 is smaller than the area of the pixel area C. As described above, therefore, concerning only the light transmitted through filter-corresponding areas c corresponding to the color filter 53R, 53G and 53B, among the light transmitted through the respective pixel areas C, the light rays having wavelength components within their absorption wavelength bands are absorbed into the color filters, so as to become colored light. The colored light is emitted ahead of the liquid crystal display element. The light transmitted through non-filter areas d which do not correspond to the color filter 53R, 53G nor 53B is not absorbed into the color filters. As a result, the light is, without being colored, emitted ahead of the liquid crystal display element.

Therefore, color pixels in the respective colors which are displayed by the light emitted from the respective pixel areas C of the liquid crystal display element 38 toward the front are pixels colored into the colors of the color filter 53R, 53G and 53B corresponding to the pixel areas C. Their brightness is raised by the non-colored light which is not subjected to the decrease in the brightness by the absorption into the color filters. Therefore, as the color image displayed by the color pixels in the respective colors, a far brighter image can be obtained than the case that colored light colored through the color filters over the whole of the pixel areas is emitted. In the third embodiment wherein this liquid crystal display element 38 is replaced by the liquid crystal display element 1 used in the first embodiment, when a sufficient screen brightness cannot be obtained by the reflected light of ambient light, illuminating light is emitted from the light radiating unit 10 to supplement the screen brightness. In addition, the colored light which is colored into the colors of the color filter 53R, 53G and 53B and the non-colored light which is not subjected to the absorption into the color filters are emitted from the respective pixel areas C of the liquid crystal display element 38, to display a bright color image. Thus, a suitable screen brightness can be obtained even in dark environments.

In the case that ambient light is used as reflected light, the ambient light which is projected from the front of the liquid crystal display element 38, reflected on the light radiating unit 10 and then emitted ahead of the liquid crystal display element 30 includes the light transmitted through different pixel areas C in the incident path and the emission path. Concerning such light, in conventional liquid crystal display elements, the light transmitted through color filters in different colors is emitted ahead of the conventional liquid crystal display element. Thus, its light intensity is weakened by the transmission through the color filters in the different colors. In the liquid crystal display element 38, however, each of the color filters 53R, 53G and 53B is made up to a shape having an area smaller than the area of the pixel area C, and is caused to correspond to the inner area except the peripheral portion of each of the pixel areas C. For this reason, light is projected in through one filter-corresponding area c of the pixel area C and then emitted therefrom through the other non-filter area d of the pixel area C. Alternatively, light is projected in through one non-filter area d of the pixel area C and then emitted therefrom through the other filter-corresponding area d of the pixel area C.

Therefore, almost all of the light transmitted through different pixel areas C in the incident path and the emission path has a very small probability that the light is transmitted through the color filters in different colors and absorbed at the incident time and the emission time. The brightness of the display image is hardly decreased on the basis thereof.

As described above, the probability that the light is transmitted through the color filters in different colors and absorbed at the incident time and the emission time is very small. For this reason, the fact does not arise that the color of the colored light emitted from the filter-corresponding areas c of the respective pixel areas C is visually mixed with the other color of the colored light emitted from the non-filter areas d of these pixel areas C to generate a color gap in the color displayed. Accordingly, a color image having a good color purity and a high quality can be displayed.

According to this liquid crystal display element, the shortage of the screen brightness based on the reflected light of ambient light is supplemented by emitting illuminating light from the light radiating unit 10. Additionally, from the respective pixel areas C of the liquid crystal display element 38, the colored light which is colored into the colors of the color filters 53R, 53G and 53B, and the non-colored light which is not subjected to the absorption into the color filters are emitted to obtain a bright color image. For these reasons, the reflectivity of the liquid crystal display element (the ratio of the intensity of the emitted light which is reflected on the light radiating unit 10 and emitted ahead of the liquid crystal display element 38 to that of the ambient light which is projected into the liquid crystal display element 38 from its front face) may be lower than that of conventional reflection type liquid crystal display devices using only the reflected light of ambient light. For this reason, even in the environment having a high illumination, for example, under the direct rays of the sun in summer, a suitable screen brightness can be obtained, which is not very dazzling.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:

a non light-emitting type display element for controlling the transmission of incident light to display an image, a light radiating unit arranged at the back of the display element for emitting illuminating light toward the display element and reflecting ambient light incident from the front of the display element at a given reflectivity toward the display element, the light radiating unit comprising a light source, a light guide, and at least one reflective film provided on the light guide for reflecting the ambient incident light into the light guide toward the display element, the light guide comprising an incident end face, at at least one end face, for taking in illuminating light from the light source, and a front face made up to a stepwise face, the stepwise face including step faces which become lower stepwise from the side of the incident end face to the other side and step-level-difference faces each of which connects the step faces which are adjacent, each of the step-level-difference faces including an emitting face for emitting the illuminating light projected from the incident end face, and an illumination brightness controller for controlling the intensity of the illuminating light so that the screen brightness of the display element comprising the total of reflected light of the ambient light reflected on the light radiating unit and transmitted light of the illuminating light is set up into a predetermined range according to the reflectivity of the light radiating unit and the environmental illumination of the ambient light radiated from the front of the display element.

2. A display device according to claim 1, wherein the illumination brightness controller controls the screen brightness, according to the environmental illumination, to the brightness corresponding to curves represented by quadratic functions satisfying the following ranges:

a screen brightness of 20–200 nits at an environmental illumination of 50 luxes, a screen brightness of 30–300 nits at an environmental illumination of 1000 luxes, and a screen brightness of 400–4000 nits at an environmental illumination of 30000 luxes.

3. A display device according to claim 1, wherein the illumination brightness controller controls the screen brightness, according to the environmental illumination, to the brightness corresponding to curves represented by quadratic functions satisfying the following ranges:

a screen brightness of 20–60 nits at an environmental illumination of 50 luxes, a screen brightness of 60–200 nits at an environmental illumination of 1000 luxes, and a screen brightness of 1000–3000 nits at an environmental illumination of 30000 luxes.

4. A display device according to claim 1, wherein the illumination brightness controller controls the screen brightness, according to the environmental illumination, to satisfy:

$$-2\times10^{-8}\times I^2+0.015\times I+20 < L < -3\times10^{-7}\times I^2+0.113\times I+150,$$

wherein the environmental illumination is represented by I (luxes) and the screen brightness is represented by L (nits).

5. A display device according to claim 1, wherein the illumination brightness controller controls the screen brightness, according to the environmental illumination, to satisfy:

$$-9\times10^{-8}\times I^2+0.0453\times I+20 < L < -2\times10^{-7}\times I^2+0.0871\times I+50,$$

wherein the environmental illumination is represented by I (luxes) and the screen brightness is represented by L (nits).

6. A display device according to claim 1, wherein the illumination brightness controller controls the brightness of the illuminating light from the light radiating unit at an environmental illumination that is, at lowest, higher than the illumination inside a room.

7. A display device according to claim 6, wherein the illumination brightness controller controls the brightness of the illuminating light from the light radiating unit in the range in which the environmental illumination is from not more than 50 luxes to more than about 30000 luxes.

8. A display device according to claim 1, wherein the illumination brightness controller controls the brightness of illuminating light from the light radiating unit in a manner that, within the illumination range in which the environmental illumination is lower than indoor illumination, the brightness of the illuminating light is continuously lowered as the environmental illumination becomes low.

9. A display device according to claim 1, wherein the illumination brightness controller controls the brightness of illuminating light from the light radiating unit in a manner that, within the illumination range in which the environmental illumination is higher than the indoor illumination and is not more than a given illumination, the brightness of the illuminating light is continuously raised as the environmental illumination rises and, within the range in which the environmental illumination exceeds the given illumination, the brightness of the illuminating light is continuously lowered as the environmental illumination further rises.

10. A display device according to claim 1, wherein the illumination brightness controller controls the brightness of illuminating light from the light radiating unit in a manner that:

1) within the illumination range in which the environmental illumination is lower than indoor illumination, the brightness of the illuminating light is lowered as the environmental illumination becomes low;

2) within the illumination range in which the environmental illumination is higher than the indoor illumination and is not more than a given illumination, the brightness of the illuminating light is raised as the environmental illumination rises, 3) within the range in which the environmental illumination exceeds the given illumination, the brightness of the illuminating light is lowered as the environmental illumination further rises.

11. A display device according to claim 1, wherein the illumination brightness controller has an illumination detector for measuring the environmental illumination, and a brightness adjusting circuit for controlling the brightness of illuminating light emitted from the light radiating unit on the basis of the measured environmental illumination.

12. A display device according to claim 1, wherein the light guide has a back face opposite to the reflective faces, and the back face is made up to a light diffusing face for averaging the brightness distribution, in the width direction of the light guide, of the illuminating light projected from the incident end face.

13. A display device according to claim 12, wherein a light diffusing film is disposed between the light radiating unit and the display element.

14. A display device according to claim 1, which further comprises a reflecting polarizer disposed between the light radiating unit and the display element, the reflecting polarizer having a reflection axis and a transmission axis crossing each other at substantially right angles and a property of reflecting incident light of the polarized component along the reflection axis and transmitting incident light of the polarized component along the transmission axis.

15. A display device according to claim 14, wherein the display element comprises a liquid crystal display element having on each of its front and back faces a polarizer, and the reflecting polarizer is arranged so that its transmission axis is substantially parallel to the transmission axis of the polarizer at the back side of the liquid crystal display element.

16. A display device according to claim 1, wherein the display element has a liquid crystal display element wherein among a pair of substrates at the front and back sides oppositely to each other through a liquid crystal layer, one substrate has on its inner face first electrodes, and the other substrate has on its inner face at least one second electrode whose portions opposite to the first electrodes are respectively made up to pixel areas, and a color filter having an area smaller than the area of each of the pixel areas is disposed on either of the substrate, corresponding to each of the pixel areas.

17. A display device according to claim 16, wherein each of the pixel areas of the liquid crystal display element has a filter-corresponding area covered with a color filter having an area smaller than the pixel area, and a non-filter area arranged around the filter-corresponding area and not covered with the color filter.

18. A display device comprising:
a non light-emitting type display element,
a transmission display system comprising a light radiating unit, which is arranged at the back of the display element, for emitting illuminating light toward the display element,
wherein the light radiating unit comprises a light source, a light guide which comprises an incident end face, at at least one end face, for taking in illuminating light from the light source, a front face made up to a stepwise face comprising step faces which become lower stepwise from the side of the incident end face to the other side and step-level-difference faces each of which connects the step faces which are adjacent, and emitting faces formed in the step-level-difference faces, for emitting the illuminating light projected from the incident end face toward the display element, and at least one reflective film for reflecting the ambient light toward the display element,
a reflection display system for reflecting the ambient light projected from the front of the display element on the light radiating unit and emitting the light ahead of the display element, and
a screen brightness compensating display system for emitting the illuminating light from the light radiating unit and compensating the screen brightness of the display element based on the reflection display system by the emitted illuminating light,
the reflectivity of the ambient light in the reflection display system being about 16% or more when the transmissivity of the display element is controlled to the maximum.

19. A display device according to claim 18, wherein the reflection display system has a reflectivity of 70% when the aperture ratio of the display element is set to 100%, the display element has an aperture ratio of about 60% or more, and the reflection display system has a color filter having a transmissivity of 36%.

20. A display device according to claim 18, wherein the reflectivity of the ambient light in the reflection display system is 20% or more.

21. A display device according to claim 18, wherein a light diffusing means is disposed between the light radiating unit and the display element and/or at the front side of the display element.

22. A display device comprising:
a non light-emitting type display element for controlling the transmission of incident light to display an image,
a light radiating unit arranged at the back of the display element for emitting illuminating light toward the display element and reflecting ambient light incident from the front of the display element at a given reflectivity toward the display element, and
an illumination brightness controller for controlling the intensity of the illuminating light so that the screen brightness of the display element comprising the total of reflected light of the ambient light reflected on the light radiating unit and transmitted light of the illuminating light is set up into a predetermined range according to the reflectivity of the light radiating unit and the environmental illumination of the ambient light radiated from the front of the display element,
wherein the light radiating unit comprises a light guide, a light source arranged at at least one end of the light guide, and an optical member arranged at the front side of the light guide,
1) the light guide comprising an incident end face, at at least one end face, for taking in illuminating light from the light source, a front face made up to a stepwise face comprising step faces which become lower stepwise from the side of the incident end face to the other side and step-level-difference faces each of which connects the step faces which are adjacent, reflective films disposed on the respective step faces of the light guide, for reflecting the ambient light toward the display element, and emitting faces formed in the respective step-level-difference faces, for emitting the illuminating light projected from the incident end face toward the display element, and
2) the optical member comprising an element which is arrange at the front side of the light guide and is for transmitting the ambient light projected from the front of the display element and emitting the reflected light of the ambient light which is reflected on the reflective films on the respective step faces of the light guide and the illuminating light emitted from the respective step-level-difference faces of the light guide toward the display element to convert the advancing direction of the light.

23. A display device according to claim 22, wherein the optical member includes a transparent plate comprising a front face, opposite to the display element, for emitting light and a back face opposite to the front face of the light guide, and projection-form incident portions are formed at the back face of the optical member, the incident portions having an incident face for taking in light emitted from the respective step-level-difference faces of the light guide and a refractive face for reflecting or refracting light taken in from the incident face toward the front.

24. A display device according to claim 23, wherein the incident portions of the optical member are disposed to leave spaces between each other, and back areas between the adjacent incident portions are made up to incident/emitting faces for transmitting the ambient light projected from the front of the display element and the reflected light of the ambient-light reflected on the reflective faces on the respective step faces of the light guide.

* * * * *